US012376653B2

(12) United States Patent
Avar et al.

(10) Patent No.: US 12,376,653 B2
(45) Date of Patent: Aug. 5, 2025

(54) LACING ENGINE SUPPORT STRUCTURES FOR AUTOMATED FOOTWEAR PLATFORM

(71) Applicant: NIKE, Inc., Beaverton, OR (US)

(72) Inventors: Eric P. Avar, Lake Oswego, OR (US); Narissa Chang, Portland, OR (US); Fanny Yung Ho, Portland, OR (US)

(73) Assignee: NIKE, Inc., Beaverton, OR (US)

( * ) Notice: Subject to any disclaimer, the term of this patent is extended or adjusted under 35 U.S.C. 154(b) by 0 days.

(21) Appl. No.: 18/382,633

(22) Filed: Oct. 23, 2023

(65) Prior Publication Data

US 2024/0041163 A1 Feb. 8, 2024

Related U.S. Application Data

(63) Continuation of application No. 17/953,690, filed on Sep. 27, 2022, now Pat. No. 11,793,276, which is a (Continued)

(51) Int. Cl.
*A43C 11/16* (2006.01)
*A43B 3/34* (2022.01)
(Continued)

(52) U.S. Cl.
CPC .............. *A43C 11/165* (2013.01); *A43B 3/34* (2022.01); *A43B 13/14* (2013.01); *H01H 13/705* (2013.01); *A43B 3/36* (2022.01)

(58) Field of Classification Search
CPC .. H01H 9/00; H01H 9/02; H01H 9/04; H01H 9/041; H01H 2221/00; H01H 2221/002;
(Continued)

(56) References Cited

U.S. PATENT DOCUMENTS 4,170,104 A 10/1979 Yamagata
4,179,826 A * 12/1979 Davidson .............. A43B 21/32 36/129

(Continued)

FOREIGN PATENT DOCUMENTS

CN 104023579 A 9/2014
CN 106793846 A 5/2017

(Continued)

OTHER PUBLICATIONS

"U.S. Appl. No. 16/165,011, Final Office Action mailed Mar. 9, 2022", 10 pgs.

(Continued)

*Primary Examiner* — Anthony R Jimenez
(74) *Attorney, Agent, or Firm* — Schwegman, Lundberg & Woessner, P.A.

(57) ABSTRACT

Systems and apparatus related to an automated footwear platform including an actuator assembly for controlling a footwear lacing apparatus are discussed. In an example, an actuator assembly can include an actuator frame with a plurality of integrated actuators. The actuator frame is adapted to interconnect elements of the actuator assembly, the actuator frame including a width, a length, and a thickness where the width and length form an exterior surface and an interior surface separated by the thickness. The plurality of actuators are integrated into the actuator frame, each actuator of the plurality of actuators including an actuator head extending from the exterior surface and a button interface extending from the backside of the actuator head through the interior surface.

18 Claims, 22 Drawing Sheets

Related U.S. Application Data continuation of application No. 16/165,011, filed on Oct. 19, 2018, now Pat. No. 11,457,696.

(60) Provisional application No. 62/574,953, filed on Oct. 20, 2017.

(51) Int. Cl.

| | |
|---|---|
| ***A43B 3/36*** | (2022.01) |
| ***A43B 13/14*** | (2006.01) |
| ***H01H 13/705*** | (2006.01) |

(58) Field of Classification Search

CPC ....... H01H 2221/004; H01H 2221/074; H01H 2221/09; H01H 2203/0085; H01H 2223/00; H01H 2223/002; H01H 2223/003; H01H 2223/044; H01H 13/00; H01H 13/04; H01H 13/06; H01H 13/14; H01H 13/70; H01H 13/705; H01H 13/86; G04B 3/00; G04B 3/001; G04B 3/048; G04B 37/106; A43B 3/001; A43B 3/34; A43B 3/36; A43B 13/14; A43B 3/0005; A43B 11/00; A43C 11/00; A43C 11/008; A43C 11/02; A43C 11/12; A43C 11/14; A43C 11/1406; A43C 11/142; A43C 11/1426; A43C 11/1493; A43C 11/165; A43C 11/06; A43C 11/08; A43C 1/00; A43C 1/003; A43C 1/02; A43C 1/04; A43C 1/06; A43C 11/16

See application file for complete search history.

(56) References Cited

U.S. PATENT DOCUMENTS

| | | | | |
|---|---|---|---|---|
| 4,382,056 | A * | 5/1983 | Coonrod | B29C 70/504 156/169 |
| 4,764,770 | A | 8/1988 | Church | |
| 6,467,924 | B2 | 10/2002 | Shipman | |
| 8,387,286 | B2 * | 3/2013 | Koyess | A43B 23/0255 36/88 |
| 8,769,844 | B2 | 7/2014 | Beers et al. | |
| 9,936,762 | B2 * | 4/2018 | Koyess | B29C 51/30 |
| 11,457,696 | B2 | 10/2022 | Avar et al. | |
| 11,793,276 | B2 | 10/2023 | Avar et al. | |
| 2003/0201983 | A1 | 10/2003 | Jokinen et al. | |
| 2004/0111920 | A1 | 6/2004 | Cretinon | |
| 2005/0210706 | A1 | 9/2005 | Johnson | |
| 2006/0207868 | A1 | 9/2006 | Wimmer et al. | |
| 2007/0000154 | A1 * | 1/2007 | DiBenedetto | A61B 5/6807 36/132 |
| 2013/0014359 | A1 | 1/2013 | Chen | |
| 2013/0086816 | A1 | 4/2013 | Johnson et al. | |
| 2013/0269219 | A1 | 10/2013 | Burns et al. | |
| 2013/0319836 | A1 | 12/2013 | Chen et al. | |
| 2015/0250259 | A1 * | 9/2015 | Attey | A43B 3/128 36/103 |
| 2016/0345661 | A1 | 12/2016 | Beers et al. | |
| 2016/0345671 | A1 | 12/2016 | Beers et al. | |
| 2017/0265560 | A1 | 9/2017 | Beers et al. | |
| 2017/0265581 | A1 | 9/2017 | Chang | |
| 2017/0265584 | A1 | 9/2017 | Walker et al. | |
| 2018/0343977 | A1 * | 12/2018 | Riccomini | A43C 1/00 |
| 2019/0116937 | A1 | 4/2019 | Avar et al. | |
| 2023/0045316 | A1 | 2/2023 | Avar et al. | |

FOREIGN PATENT DOCUMENTS

| | | | |
|---|---|---|---|
| CN | 111295107 | A | 6/2020 |
| CN | 111295107 | B | 11/2021 |
| CN | 114145546 | A | 3/2022 |
| EP | 3697250 | B1 | 3/2023 |
| JP | S502309 | Y1 | 1/1975 |
| JP | 2002271047 | A | 9/2002 |
| JP | 2002343457 | A | 11/2002 |
| JP | 2013247655 | A | 12/2013 |
| JP | 2015225780 | | 12/2015 |
| JP | 2017174712 | | 9/2017 |
| JP | 2021500125 | A | 1/2021 |
| JP | 2022169631 | A | 11/2022 |
| KR | 20200060525 | A | 5/2020 |
| KR | 102229928 | B1 | 3/2021 |
| KR | 20210032017 | A | 3/2021 |
| KR | 102472831 | B1 | 11/2022 |
| KR | 20220160713 | A | 12/2022 |
| KR | 102677793 | | 6/2024 |
| KR | 20240095486 | | 6/2024 |
| WO | WO-2016191124 | A1 | 12/2016 |
| WO | WO-2017160659 | A2 | 9/2017 |
| WO | WO-2019079670 | A1 | 4/2019 |

OTHER PUBLICATIONS

"U.S. Appl. No. 16/165,011, Non Final Office Action mailed Sep. 7, 2021", 12 pgs.

"U.S. Appl. No. 16/165,011, Non Final Office Action mailed Dec. 8, 2020", 8 pgs.

"U.S. Appl. No. 16/165,011, Notice of Allowance mailed May 26, 2022", 6 pgs.

"U.S. Appl. No. 16/165,011, Response filed Apr. 29, 2022 to Final Office Action mailed Mar. 9, 2022", 9 pgs.

"U.S. Appl. No. 16/165,011, Response filed Jun. 8, 2021 to Non Final Office Action mailed Dec. 8, 2020", 9 pgs.

"U.S. Appl. No. 16/165,011, Response filed Jun. 19, 2020 to Restriction Requirement mailed Mar. 20, 2020", 7 pgs.

"U.S. Appl. No. 16/165,011, Response filed Dec. 7, 2021 to Non Final Office Action mailed Sep. 7, 2021", 11 pgs.

"U.S. Appl. No. 16/165,011, Restriction Requirement mailed Mar. 20, 2020", 6 pgs.

"U.S. Appl. No. 17/953,690, Non Final Office Action mailed Feb. 16, 2023", 11 pgs.

"U.S. Appl. No. 17/953,690, Notice of Allowance mailed Jun. 15, 2023", 8 pgs.

"U.S. Appl. No. 17/953,690, Preliminary Amendment filed Oct. 26, 2022", 6 pgs.

"U.S. Appl. No. 17/953,690, Response filed May 16, 2023 to Non Final Office Action mailed Feb. 16, 2023", 11 pgs.

"Chinese Application Serial No. 201880068375.8, Office Action mailed Nov. 27, 2020", With English machine translation, 12 pgs.

"Chinese Application Serial No. 201880068375.8, Response filed Jun. 15, 2021 to Office Action mailed Nov. 27, 2020", w/ English claims, 45 pgs.

"Chinese Application Serial No. 201880068375.8, Voluntary Amendment filed Sep. 24, 2020", w/ English claims, I don't have the chinese version of the voluntary amendment filed, they only provided the PPH request . . . I think we replaced the claims?, 5 pgs.

"European Application Serial No. 18867541.7, Communication Pursuant to Article 94(3) EPC mailed Jan. 26, 2022", 6 pgs.

"European Application Serial No. 18867541.7, Extended European Search Report mailed May 18, 2021", 8 pgs.

"European Application Serial No. 18867541.7, Response filed Jun. 6, 2022 to Communication Pursuant to Article 94(3) EPC mailed Jan. 26, 2022", 9 pgs.

"European Application Serial No. 18867541.7, Response filed Dec. 16, 2021 to Extended European Search Report mailed May 18, 2021", 23 pgs.

"European Application Serial No. 18867541.7, Response to Communication Pursuant to Rules 161 & 162 filed Nov. 23, 2020", Agent drafted response Nov. 2019, filed on Nov. 2023, 10 pgs.

"European Application Serial No. 23162999.9, Extended European Search Report mailed Jun. 13, 2023", 11 pgs.

"International Application Serial No. PCT/US2018/056625, International Preliminary Report on Patentability mailed Apr. 30, 2020", 10 pgs.

"International Application Serial No. PCT/US2018/056625, International Search Report mailed Feb. 8, 2019", 4 pgs.

(56) References Cited

OTHER PUBLICATIONS

"International Application Serial No. PCT/US2018/056625, Written Opinion mailed Feb. 8, 2019", 8 pgs.
"Japanese Application Serial No. 2020-522011, Examiners Decision of Final Refusal mailed Apr. 12, 2022", w/ English translation, 5 pgs.
"Japanese Application Serial No. 2020-522011, Notification of Reasons for Refusal mailed Jul. 6, 2021", With English translation, 6 pgs.
"Japanese Application Serial No. 2020-522011, Response filed Nov. 11, 2021 to Notification of Reasons for Refusal mailed Jul. 6, 2021", w/ English claims, 6 pgs.
"Japanese Application Serial No. 2022-128008, Notification of Reasons for Rejection mailed Oct. 17, 2023", w/ English Translation, 8 pgs.
"Japanese Application Serial No. 2022-128008, Voluntary Amendment filed Aug. 31, 2022", w/ English claims, 9 pgs.
"Korean Application Serial No. 10-2020-7014467, Voluntary Amendment filed Aug. 12, 2020", w/ English claims, 15 pgs.
"Korean Application Serial No. 10-2021-7007675, Notice of Preliminary Rejection mailed Jan. 11, 2022", With English machine translation, 10 pgs.
"Korean Application Serial No. 10-2021-7007675, Response filed Apr. 7, 2022 to Notice of Preliminary Rejection mailed Jan. 11, 2022", w/ English claims, 10 pgs.
"Korean Application Serial No. 10-2021-7007675, Voluntary Amendment filed Apr. 13, 2021", w/ English claims, 10 pgs.
"Korean Application Serial No. 10-2022-7041484, Notice of Preliminary Rejection mailed Jul. 25, 2023", w/o English Translation, 3 pgs.
"Korean Application Serial No. 10-2022-7041484, Response filed Sep. 21, 2023 to Notice of Preliminary Rejection mailed Jul. 25, 2023", w English claims, 11 pgs.
"Chinese Application Serial No. 202111318037.5, Office Action mailed Jan. 12, 2024", w English Translation, 9 pgs.
"Japanese Application Serial No. 2022-128008, Response filed Jan. 10, 2024 to Notification of Reasons for Rejection mailed Oct. 17, 2023", w English claims, 10 pgs.
"European Application Serial No. 23162999.9, Response filed Jan. 22, 2024 to Extended European Search Report mailed Jun. 13, 2023", 25 pgs.
"Japanese Application Serial No. 2022-128008, Examiners Decision of Final Refusal mailed Apr. 23, 2024", With English Machine Translation, 5 pgs.
"Chinese Application Serial No. 202111318037.5, Response filed May 13, 2024 to Office Action mailed Jan. 12, 2024", W English Claims, 10 pgs.
"Chinese Application Serial No. 202111318037.5, Decision of Rejection mailed Jun. 22, 2024", With English Machine Translation, 14 pgs.
"Chinese Application Serial No. 202111318037.5, Request for Reexamination filed Sep. 23, 2024", W/English Claims, 8 pgs.
"Japanese Application Serial No. 2022-128008, Response filed Aug. 22, 2024 to Examiners Decision of Final Refusal mailed Apr. 23, 2024", w/ current English claims, 15 pgs.
"Korean Application Serial No. 10-2024-7020323, Notice of Preliminary Rejection mailed Sep. 5, 2024", W/English Translation, 9 pgs.

* cited by examiner

LACING ENGINE SUPPORT STRUCTURES FOR AUTOMATED FOOTWEAR PLATFORM

RELATED APPLICATIONS

This application is a continuation of U.S. patent application Ser. No. 17/953,690 filed Sep. 27, 2022, which application is a continuation of U.S. patent application Ser. No. 16/165,011, filed Oct. 19, 2018, issued on Oct. 4, 2022 as U.S. Pat. No. 11,457,696, which application claims the benefit of priority to U.S. Provisional Application Ser. No. 62/574,953, filed Oct. 20, 2017, the contents of all which are incorporated herein by reference in their entireties.

The following specification describes various aspects of a motorized lacing system, motorized and non-motorized lacing engines, footwear components related to the lacing engines, automated lacing footwear platforms, as well as related actuation and support structures.

BACKGROUND

Devices for automatically tightening an article of footwear have been previously proposed. Liu, in U.S. Pat. No. 6,691,433, titled "Automatic tightening shoe", provides a first fastener mounted on a shoe's upper portion, and a second fastener connected to a closure member and capable of removable engagement with the first fastener to retain the closure member at a tightened state. Liu teaches a drive unit mounted in the heel portion of the sole. The drive unit includes a housing, a spool rotatably mounted in the housing, a pair of pull strings and a motor unit. Each string has a first end connected to the spool and a second end corresponding to a string hole in the second fastener. The motor unit is coupled to the spool. Liu teaches that the motor unit is operable to drive rotation of the spool in the housing to wind the pull strings on the spool for pulling the second fastener towards the first fastener. Liu also teaches a guide tube unit that the pull strings can extend through.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

Figure 1:
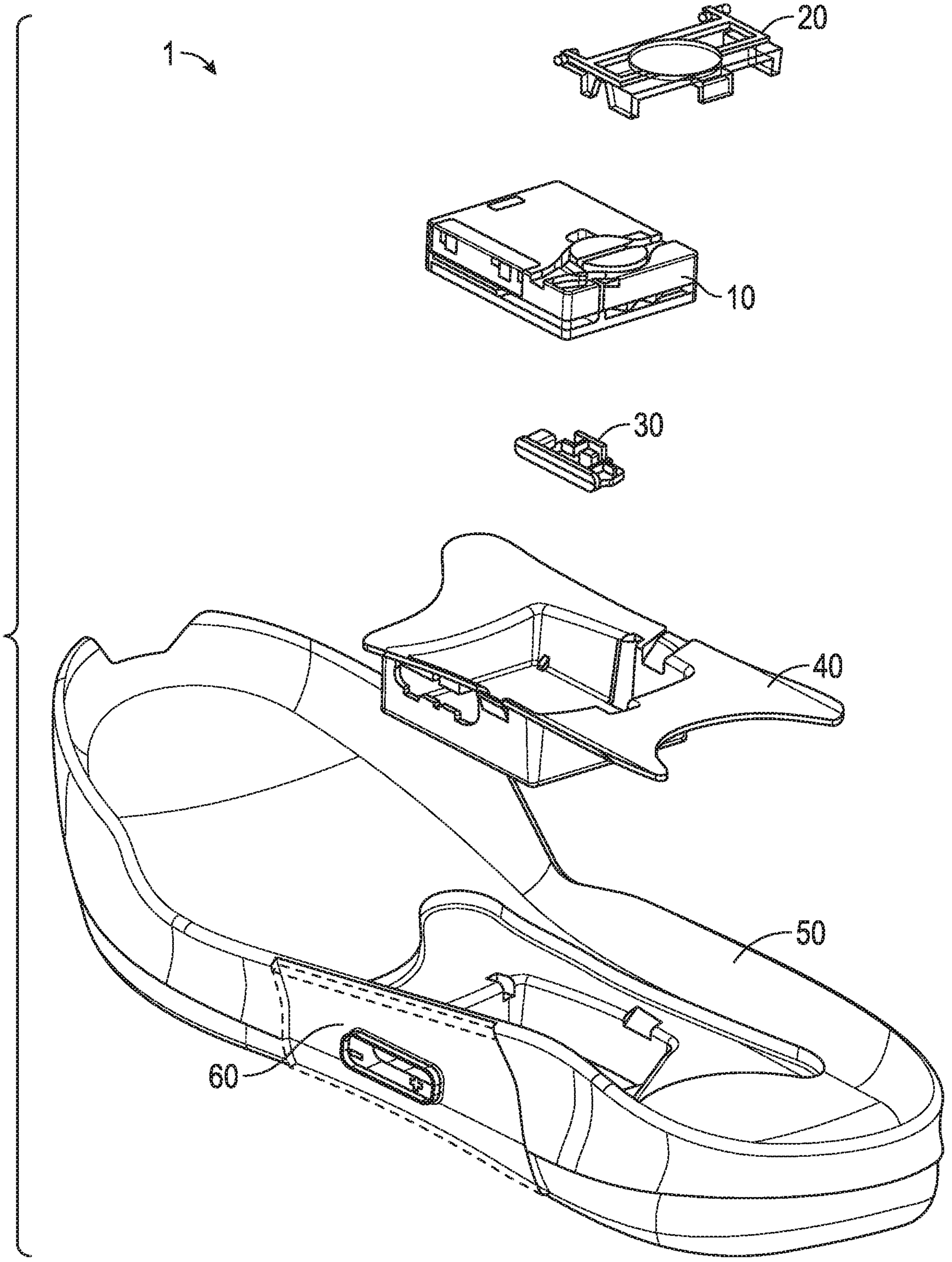
FIG. 1 is an exploded view illustration of components of a motorized lacing system, according to some example embodiments.

The headings provided herein are merely for convenience and do not necessarily affect the scope or meaning of the terms used.

DETAILED DESCRIPTION

The concept of self-tightening shoe laces was first widely popularized by the fictitious power-laced Nike® sneakers worn by Marty McFly in the movie Back to the Future II, which was released back in 1989. While Nike® has since released at least one version of power-laced sneakers similar in appearance to the movie prop version from Back to the Future II, the internal mechanical systems and surrounding footwear platform employed in these early versions do not necessarily lend themselves to mass production or daily use. Additionally, previous designs for motorized lacing systems comparatively suffered from problems such as high cost of manufacture, complexity, assembly challenges, lack of serviceability, and weak or fragile mechanical mechanisms, to highlight just a few of the many issues. The present inventors have developed a modular footwear platform to accommodate motorized and non-motorized lacing engines that solves some or all of the problems discussed above, among others. The components discussed below provide various benefits including, but not limited to: serviceable components, interchangeable automated lacing engines, robust mechanical design, reliable operation, streamlined assembly processes, and retail-level customization. Various other benefits of the components described below will be evident to persons of skill in the relevant arts.

The motorized lacing engine discussed below was developed from the ground up to provide a robust, serviceable, and inter-changeable component of an automated lacing footwear platform. The lacing engine includes unique design elements that enable retail-level final assembly into a modular footwear platform. The lacing engine design allows for the majority of the footwear assembly process to leverage known assembly technologies, with unique adaptions to standard assembly processes still being able to leverage current assembly resources.

In an example, the modular automated lacing footwear platform includes a mid-sole plate secured to the mid-sole for receiving a lacing engine. The design of the mid-sole plate allows a lacing engine to be dropped into the footwear platform as late as at a point of purchase. The mid-sole plate, and other aspects of the modular automated footwear platform, allow for different types of lacing engines to be used interchangeably. For example, the motorized lacing engine discussed below could be changed out for a human-powered lacing engine. Alternatively, a fully-automatic motorized lacing engine with foot presence sensing or other optional features could be accommodated within the standard mid-sole plate. The mid-sole plate is also designed to protect a lacing engine from external impacts and similar stresses.

The automated footwear platform discussed herein can include an actuator apparatus, such as an outsole actuator interface to provide tightening control to the end user as well as visual feedback through LED lighting projected through translucent actuators accessible from an outer surface of the footwear platform. The actuator can provide tactile and visual feedback to the user to indicate status of the lacing engine or other automated footwear platform components. In some examples, the actuators provide a weather resistant or weather proof interface to a lacing engine or other automated footwear systems.

This initial overview is intended to introduce the subject matter of the present patent application. It is not intended to provide an exclusive or exhaustive explanation of the various inventions disclosed in the following more detailed description.

Automated Footwear Platform

The following discusses various components of the automated footwear platform including a motorized lacing engine, a mid-sole plate, and various other components of the platform. While much of this disclosure focuses on a motorized lacing engine, many of the mechanical aspects of the discussed designs are applicable to a human-powered lacing engine or other motorized lacing engines with additional or fewer capabilities. Accordingly, the term "automated" as used in "automated footwear platform" is not intended to only cover a system that operates without user input. Rather, the term "automated footwear platform" includes various electrically powered and human-power, automatically activated and human activated mechanisms for tightening a lacing or retention system of the footwear.

FIG. 1 is an exploded view illustration of components of a motorized lacing system for footwear, according to some example embodiments. The motorized lacing system 1 illustrated in FIG. 1 includes a lacing engine 10, a lid 20, an actuator 30, a mid-sole plate 40, a mid-sole 50, and an outsole 60. FIG. 1 illustrates the basic assembly sequence of components of an automated lacing footwear platform. The motorized lacing system 1 starts with the mid-sole plate 40 being secured within the mid-sole. Next, the actuator 30 is inserted into an opening in the lateral side of the mid-sole plate opposite to interface buttons that can be embedded in the outsole 60. Next, the lacing engine 10 is dropped into the mid-sole plate 40. In an example, the lacing system 1 is inserted under a continuous loop of lacing cable and the lacing cable is aligned with a spool in the lacing engine 10 (discussed below). Finally, the lid 20 is inserted into grooves in the mid-sole plate 40, secured into a closed position, and latched into a recess in the mid-sole plate 40. The lid 20 can capture the lacing engine 10 and can assist in maintaining alignment of a lacing cable during operation.

In an example, the footwear article or the motorized lacing system 1 includes or is configured to interface with one or more sensors that can monitor or determine a foot presence characteristic. Based on information from one or more foot presence sensors, the footwear including the motorized lacing system 1 can be configured to perform various functions. For example, a foot presence sensor can be configured to provide binary information about whether a foot is present or not present in the footwear. If a binary signal from the foot presence sensor indicates that a foot is present, then the motorized lacing system 1 can be activated, such as to automatically tighten or relax (i.e., loosen) a footwear lacing cable. In an example, the footwear article includes a processor circuit that can receive or interpret signals from a foot presence sensor. The processor circuit can optionally be embedded in or with the lacing engine 10, such as in a sole of the footwear article.

Figure 2:
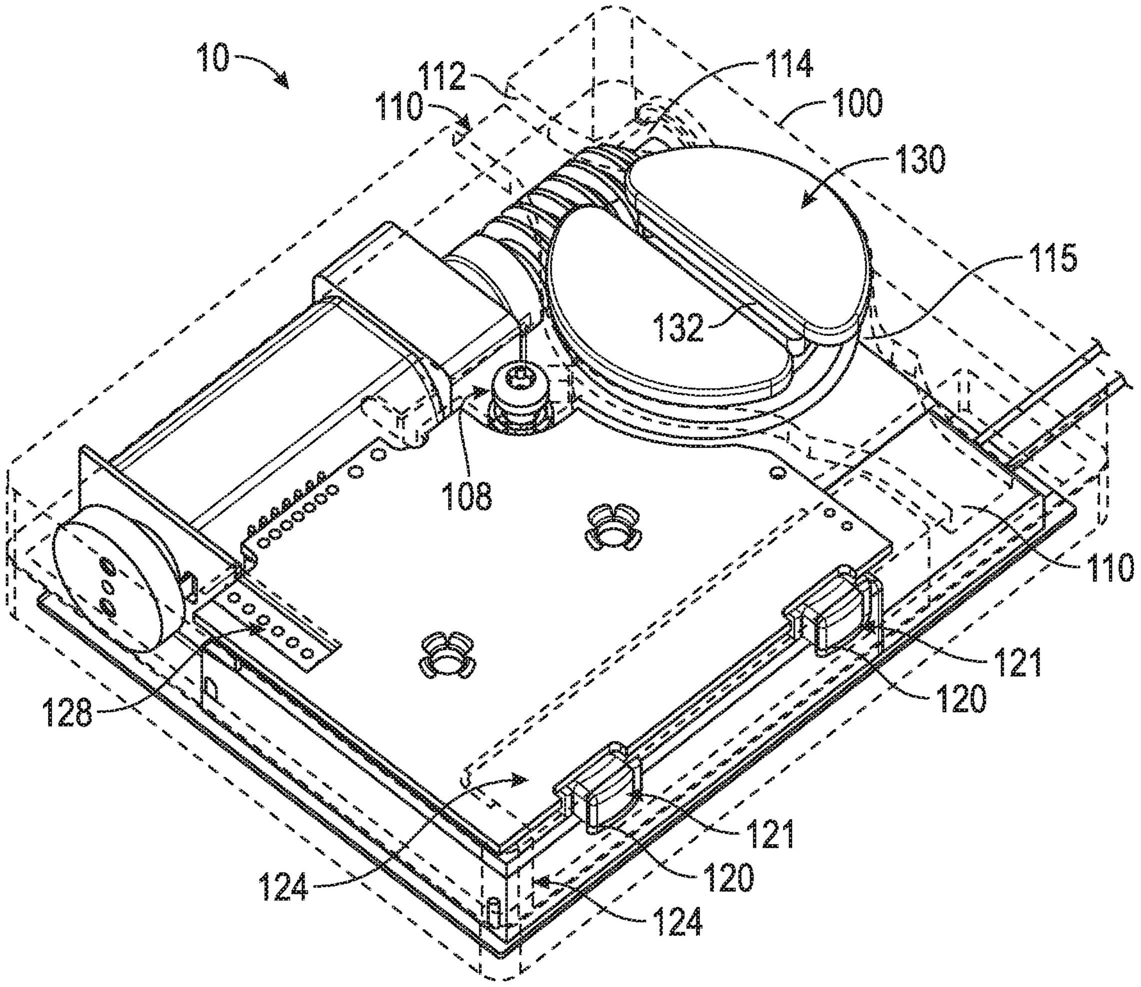
FIG. 2 is a diagram illustrating a motorized lacing engine, according to some example embodiments.

Examples of the lacing engine 10 are described in some detail in reference to FIG. 2, and in additional detail in co-pending application Ser. No. 15/456,317, Titled "ACTUATOR FOR AN AUTOMATED FOOTWEAR PLATFORM," which is hereby incorporated by reference in its entirety. Examples of the actuator 30 and similar actuator assemblies are described in detail in reference to FIGS. 3A-3D as well as FIGS. 9A-9F. Examples of the mid-sole plate 40 are described in detail in reference to FIGS. 4A-4D as well as in FIGS. 8A-8G. Various additional details of the motorized lacing system 1 are discussed throughout the remainder of the description.

FIG. 2 is a diagram illustrating a motorized lacing engine, according to some example embodiments. FIG. 2A introduces various external features of an example lacing engine 10, including a housing structure 100, case screw 108, lace channel 110 (also referred to as lace guide relief 110), lace channel wall 112, lace channel transition 114, spool recess 115, button openings 120, buttons 121, button membrane seal 124, programming header 128, spool 130, and lace grove 132.

In an example, the lacing engine 10 is held together by one or more screws, such as the case screw 108. The case screw 108 is positioned near the primary drive mechanisms to enhance structural integrity of the lacing engine 10. The case screw 108 also functions to assist the assembly process, such as holding the case together for ultra-sonic welding of exterior seams.

In this example, the lacing engine 10 includes a lace channel 110 to receive a lace or lace cable once assembled into the automated footwear platform. The lace channel 110 can include a lace channel wall 112. The lace channel wall 112 can include chamfered edges to provide a smooth guiding surface for a lace cable to run in during operation. Part of the smooth guiding surface of the lace channel 110 can include a channel transition 114, which is a widened portion of the lace channel 110 leading into the spool recess 115. The spool recess 115 transitions from the channel transition 114 into generally circular sections that conform closely to the profile of the spool 130. The spool recess 115 assists in retaining the spooled lace cable, as well as in retaining position of the spool 130. However, other aspects of the design provide primary retention of the spool 130. In this example, the spool 130 is shaped similarly to half of a yo-yo with a lace grove 132 running through a flat top surface and a spool shaft 133 (not shown in FIG. 2A) extending inferiorly from the opposite side. The spool 130 is described in further detail below in reference of additional figures.

The lateral side of the lacing engine 10 includes button openings 120 that enable buttons 121 for activation of the mechanism to extend through the housing structure 100. The buttons 121 provide an external interface for activation of switches 122, illustrated in additional figures discussed below. In some examples, the housing structure 100 includes button membrane seal 124 to provide protection from dirt and water. In this example, the button membrane seal 124 is up to a few mils (thousandth of an inch) thick clear plastic (or similar material) adhered from a superior surface of the housing structure 100 over a corner and down a lateral side. In another example, the button membrane seal 124 is a 2 mil thick vinyl adhesive backed membrane covering the buttons 121 and button openings 120. As discussed in detail below, an actuator assembly is used to transfer access to the buttons 121 to an outside surface of the footwear assembly. The actuator assembly is designed to provide a particular tactile feel and protect the lacing engine from weather and debris.

Figure 3A:
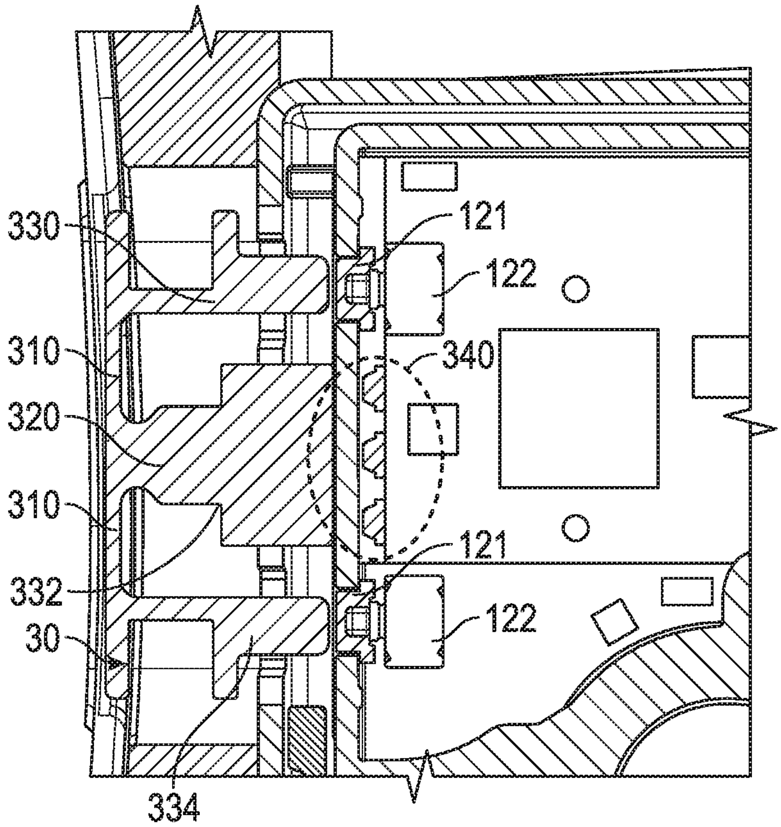
FIGS. 3A-3D are diagrams and drawings illustrating an actuator for interfacing with a motorized lacing engine, according to some example embodiments.

FIGS. 3A-3D are diagrams and drawings illustrating an actuator 30 for interfacing with a motorized lacing engine, according to an example embodiment. Another example actuator assembly is discussed below in reference to FIGS. 9A-9F. In this example, the actuator 30 includes features such as bridge 310, light pipe 320, posterior arm 330, central arm 332, and anterior arm 334. FIG. 3A also illustrates related features of lacing engine 10, such as LEDs 340 (also referenced as LED 340), buttons 121 and switches 122. In this example, the posterior arm 330 and anterior arm 334 each can separately activate one of the switches 122 through buttons 121. The actuator 30 is also designed to enable activation of both switches 122 simultaneously, for things like reset or other functions. The primary function of the actuator 30 is to provide tightening and loosening commands to the lacing engine 10. The actuator 30 also includes a light pipe 320 that directs light from LEDs 340 out to the external portion of the footwear platform (e.g., outsole 60). The light pipe 320 is structured to disperse light from multiple individual LED sources evening across the face of actuator 30.

In this example, the arms of the actuator 30, posterior arm 330 and anterior arm 334, include flanges to prevent over activation of switches 122 providing a measure of safety against impacts against the side of the footwear platform. The large central arm 332 is also designed to carry impact loads against the side of the lacing engine 10, instead of allowing transmission of these loads against the buttons 121.

Figure 3B:
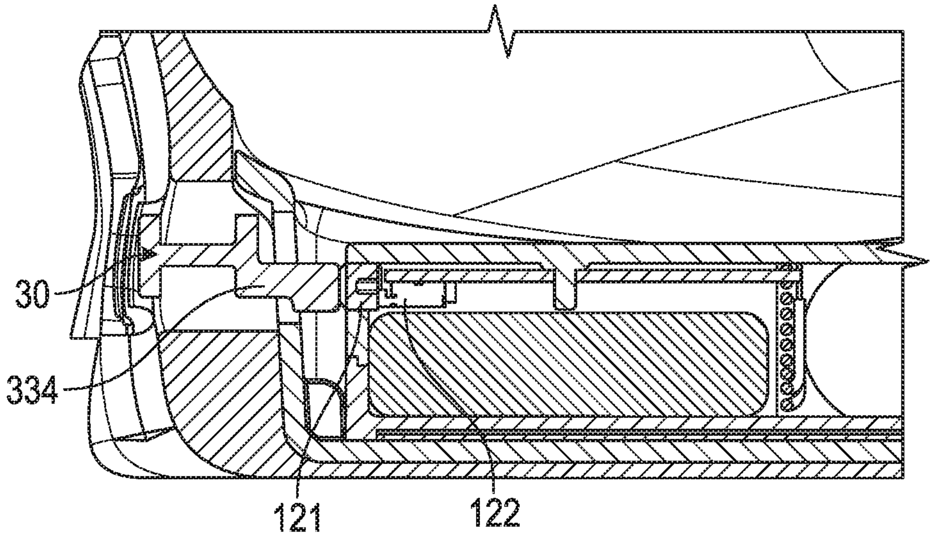
Figure 3C:
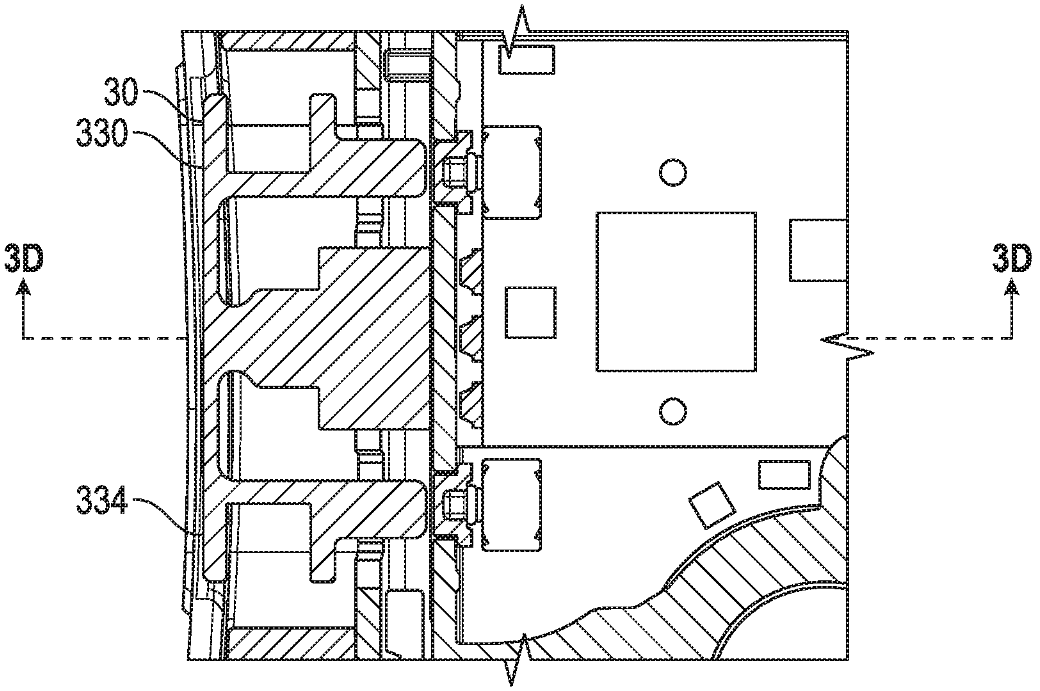
Figure 3D:
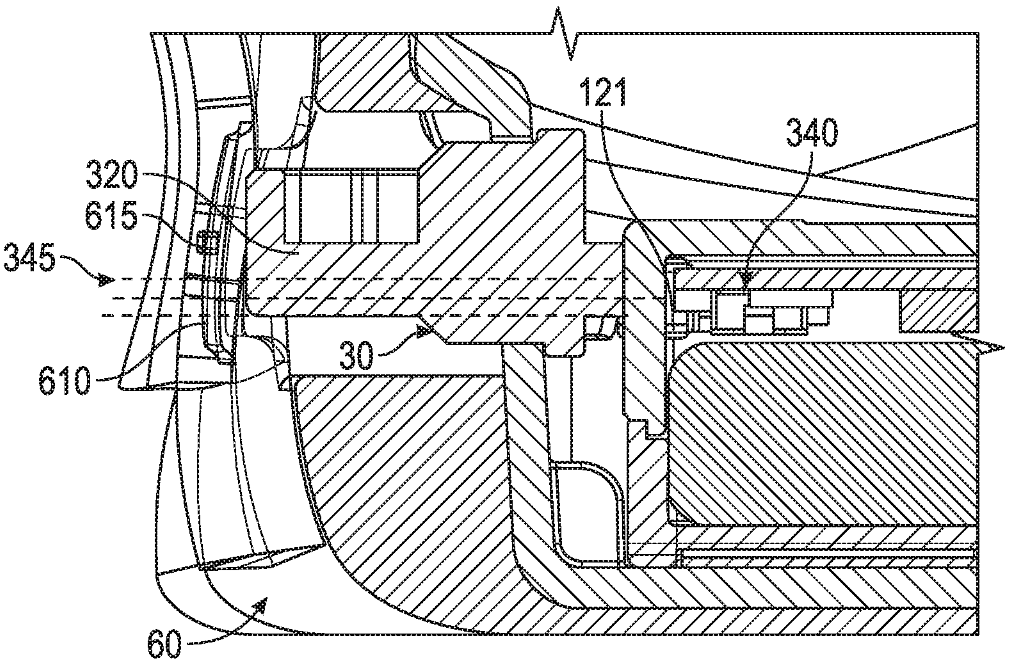

FIG. 3B provides a side view of the actuator 30, which further illustrates an example structure of anterior arm 334 and engagement with button 121. FIG. 3C is an additional top view of actuator 30 illustrating activation paths through posterior arm 330 and anterior arm 334. FIG. 3C also depicts section line A-A, which corresponds to the cross-section illustrated in FIG. 3D. In FIG. 3D, the actuator 30 is illustrated in cross-section with transmitted light 345 shown in dotted lines. The light pipe 320 provides a transmission medium for transmitted light 345 from LEDs 340. FIG. 3D also illustrates aspects of outsole 60, such as actuator cover 610 and raised actuator interface 615.

FIGS. 4A-4D are diagrams and drawings illustrating a mid-sole plate 40 for holding lacing engine 10, according to some example embodiments. An additional example mid-sole plate is discussed below in reference to FIGS. 8A-8G. In this example, the mid-sole plate 40 includes features such as lacing engine cavity 410, medial lace guide 420, lateral lace guide 421, lid slot 430, anterior flange 440, posterior flange 450, a superior surface 460, an inferior surface 470, and an actuator cutout 480. The lacing engine cavity 410 is designed to receive lacing engine 10. In this example, the lacing engine cavity 410 retains the lacing engine 10 is lateral and anterior/posterior directions, but does not include any built in feature to lock the lacing engine 10 in to the pocket. Optionally, the lacing engine cavity 410 can include detents, tabs, or similar mechanical features along one or more sidewalls that could positively retain the lacing engine 10 within the lacing engine cavity 410.

The medial lace guide 420 and lateral lace guide 421 assist in guiding lace cable into the lace engine pocket 410 and over lacing engine 10 (when present). The medial/lateral lace guides 420, 421 can include chamfered edges and inferiorly slated ramps to assist in guiding the lace cable into the desired position over the lacing engine 10. In this example, the medial/lateral lace guides 420, 421 include openings in the sides of the mid-sole plate 40 that are many times wider than the typical lacing cable diameter, in other examples the openings for the medial/lateral lace guides 420, 421 may only be a couple times wider than the lacing cable diameter.

In this example, the mid-sole plate 40 includes a sculpted or contoured anterior flange 440 that extends much further on the medial side of the mid-sole plate 40. The example anterior flange 440 is designed to provide additional support under the arch of the footwear platform. However, in other examples the anterior flange 440 may be less pronounced in on the medial side. In this example, the posterior flange 450 also includes a particular contour with extended portions on both the medial and lateral sides. The illustrated posterior flange 450 shape provides enhanced lateral stability for the lacing engine 10.

Figure 4A:
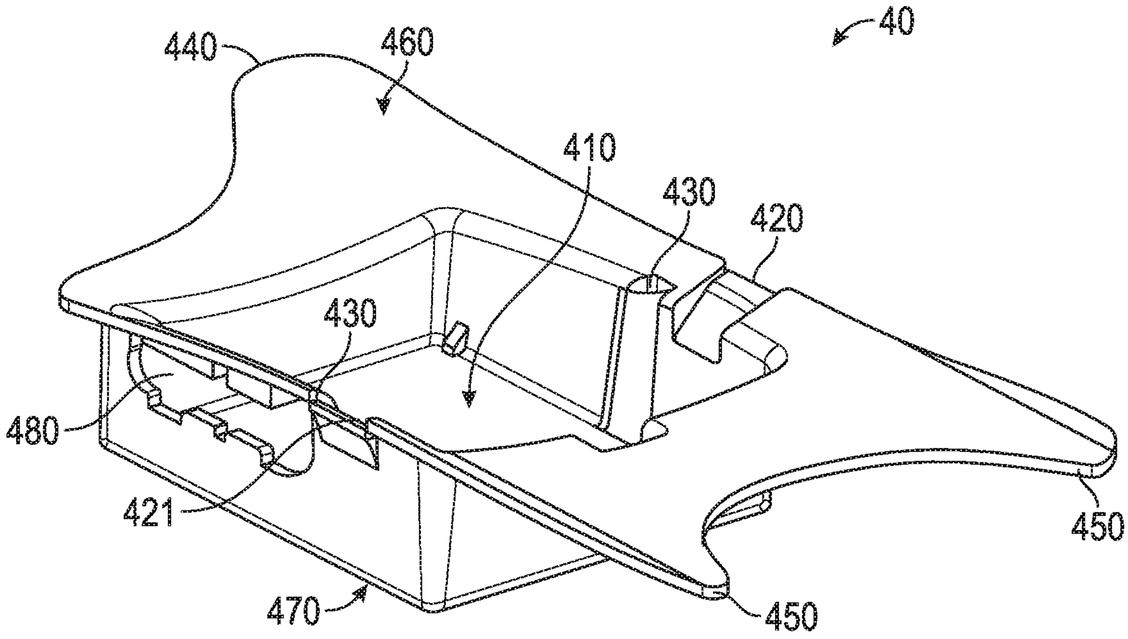
FIGS. 4A-4D are diagrams and drawings illustrating a mid-sole plate for holding a lacing engine, according to some example embodiments.
Figure 4B:
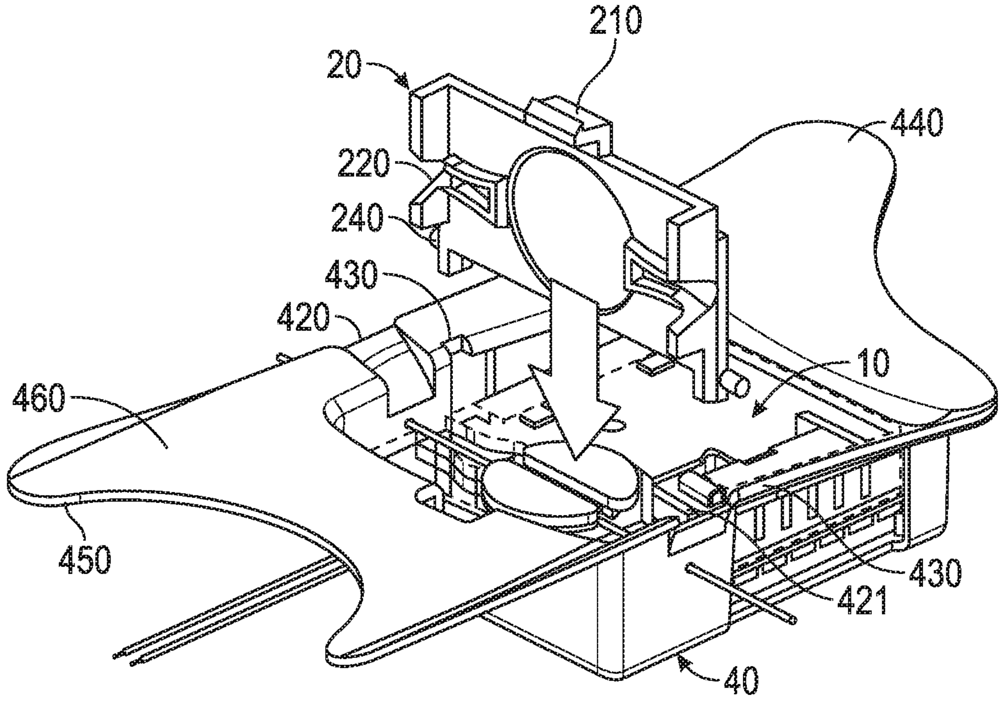
Figure 4C:
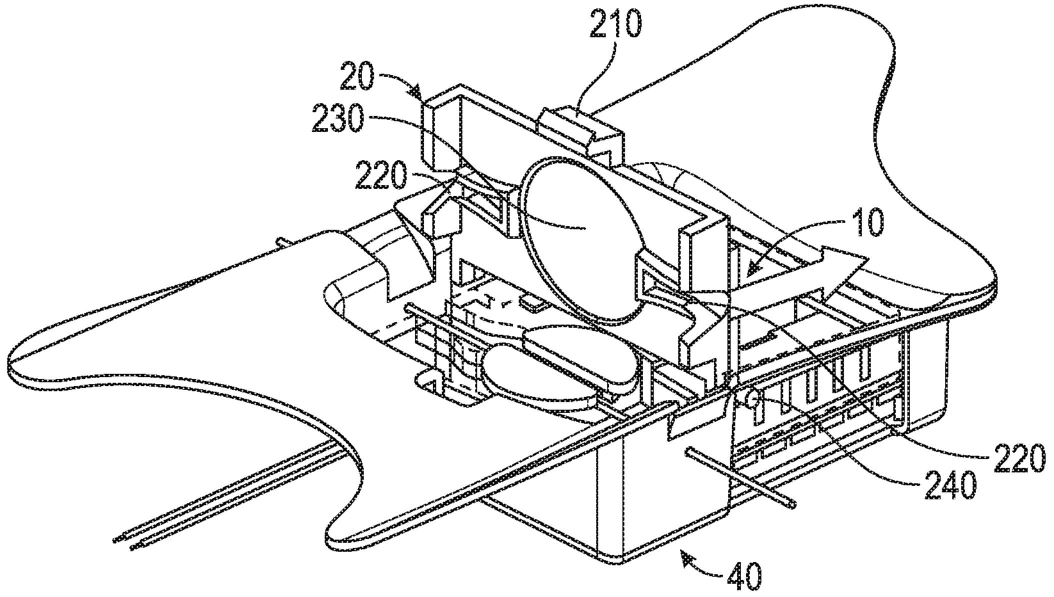
Figure 4D:
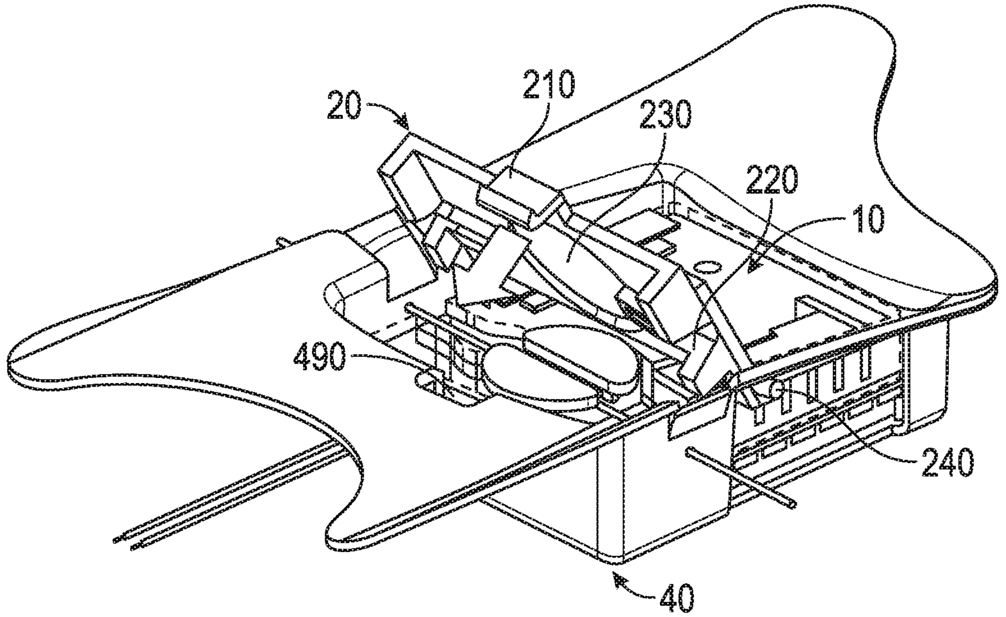

FIGS. 4B-4D illustrate insertion of the lid 20 into the mid-sole plate 40 to retain the lacing engine 10 and capture lace cable 131. In this example, the lid 20 includes features such as latch 210, lid lace guides 220, lid spool recess 230, and lid clips 240. The lid lace guides 220 can include both medial and lateral lid lace guides 220. The lid lace guides 220 assist in maintaining alignment of the lace cable 131 through the proper portion of the lacing engine 10. The lid clips 240 can also include both medial and lateral lid clips 240. The lid clips 240 provide a pivot point for attachment of the lid 20 to the mid-sole plate 40. As illustrated in FIG. 4B, the lid 20 is inserted straight down into the mid-sole plate 40 with the lid clips 240 entering the mid-sole plate 40 via the lid slots 430.

As illustrated in FIG. 4C, once the lid clips 240 are inserted through the lid slots 430, the lid 20 is shifted anteriorly to keep the lid clips 240 from disengaging from the mid-sole plate 40. FIG. 4D illustrates rotation or pivoting of the lid 20 about the lid clips 240 to secure the lacing engine 10 and lace cable 131 by engagement of the latch 210 with a lid latch recess 490 in the mid-sole plate 40. Once snapped into position, the lid 20 secures the lacing engine 10 within the mid-sole plate 40.

Figure 5A:
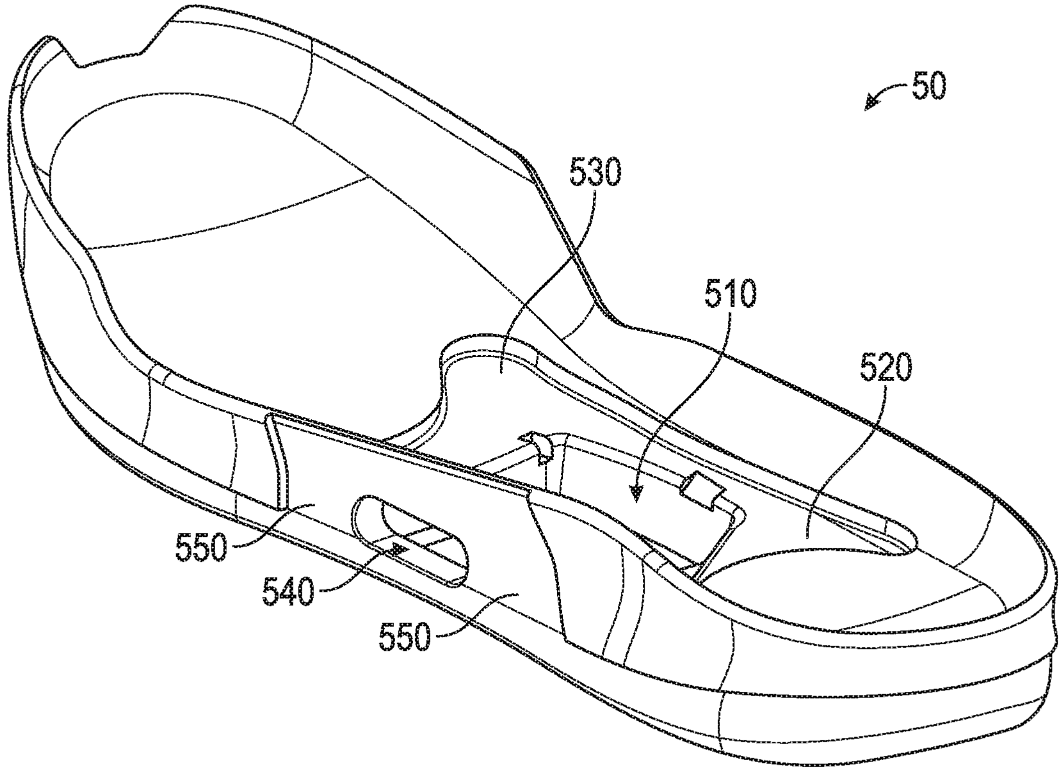
FIGS. 5A-5D are diagrams and drawings illustrating a mid-sole and out-sole to accommodate a lacing engine and related components, according to some example embodiments.
Figure 5B:
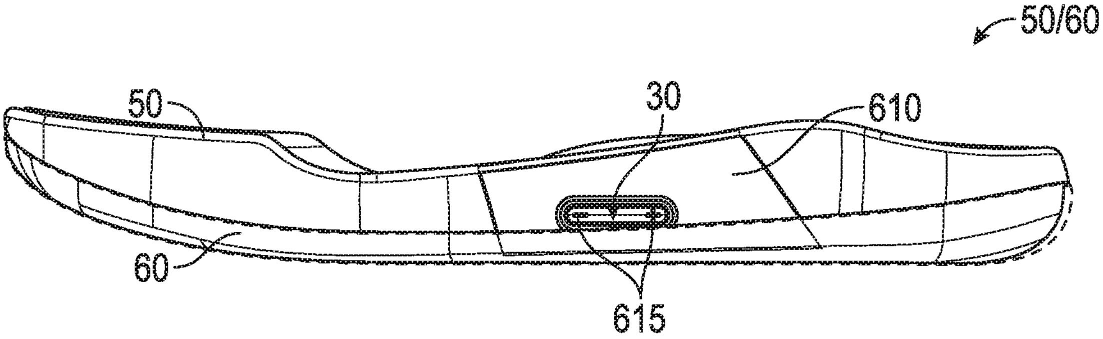
Figure 5C:
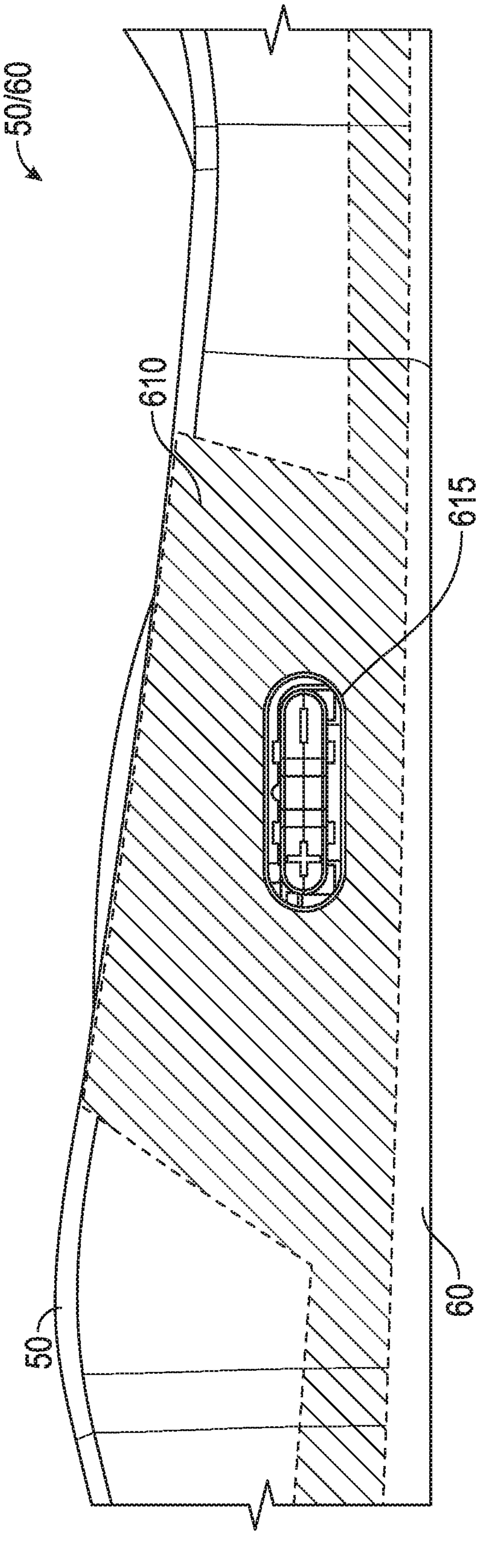

FIGS. 5A-5D are diagrams and drawings illustrating a mid-sole 50 and out-sole 60 configured to accommodate lacing engine 10 and related components, according to some example embodiments. The mid-sole 50 can be formed from any suitable footwear material and includes various features to accommodate the mid-sole plate 40 and related components. In this example, the mid-sole 50 includes features such as plate recess 510, anterior flange recess 520, posterior flange recess 530, actuator opening 540 and actuator cover recess 550. The plate recess 510 includes various cutouts and similar features to match corresponding features of the mid-sole plate 40. The actuator opening 540 is sized and positioned to provide access to the actuator 30 from the lateral side of the footwear platform 1. The actuator cover recess 550 is a recessed portion of the mid-sole 50 adapted to accommodate a molded covering to protect the actuator 30 and provide a particular tactile and visual look for the primary user interface to the lacing engine 10, as illustrated in FIGS. 5B and 5C.

FIGS. 5B and 5C illustrate portions of the mid-sole 50 and out-sole 60, according to example embodiments. FIG. 5B includes illustration of exemplary actuator cover 610 and raised actuator interface 615, which is molded or otherwise formed into the actuator cover 610. FIG. 5C illustrates an additional example of actuator 610 and raised actuator interface 615 including horizontal striping to disperse portions of the light transmitted to the out-sole 60 through the light pipe 320 portion of actuator 30.

Figure 5D:
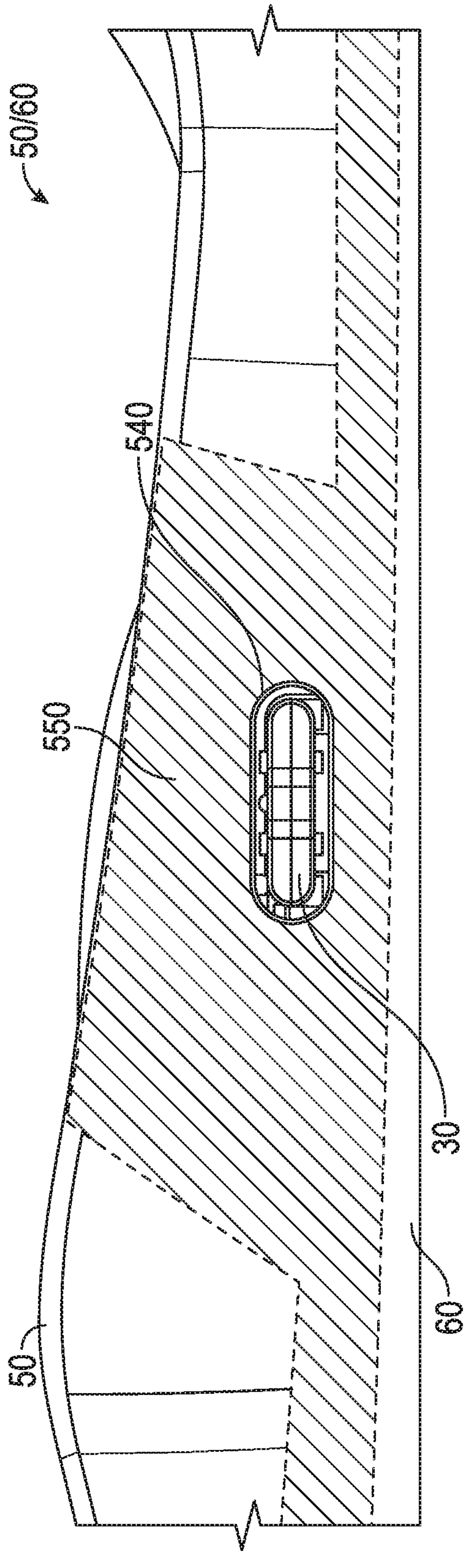

FIG. 5D further illustrates actuator cover recess 550 on mid-sole 50 as well as positioning of actuator 30 within actuator opening 540 prior to application of actuator cover 610. In this example, the actuator cover recess 550 is designed to receive adhesive to adhere actuator cover 610 to the mid-sole 50 and out-sole 60.

Figure 6A:
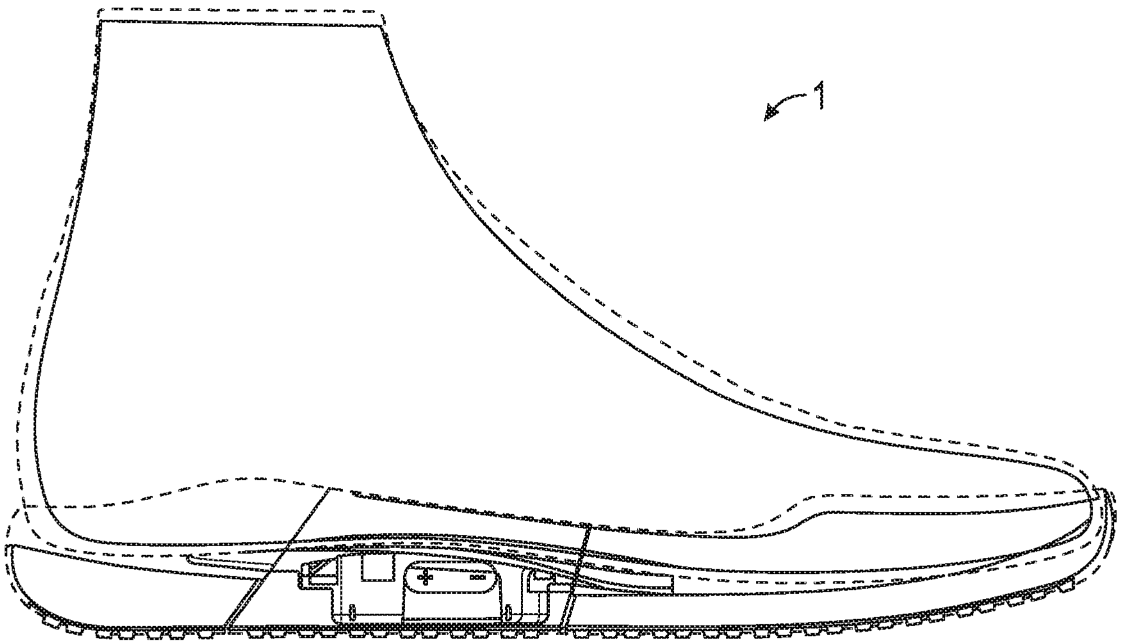
FIGS. 6A-6C are illustrations of a footwear assembly including a motorized lacing engine, according to some example embodiments.
Figure 6B:
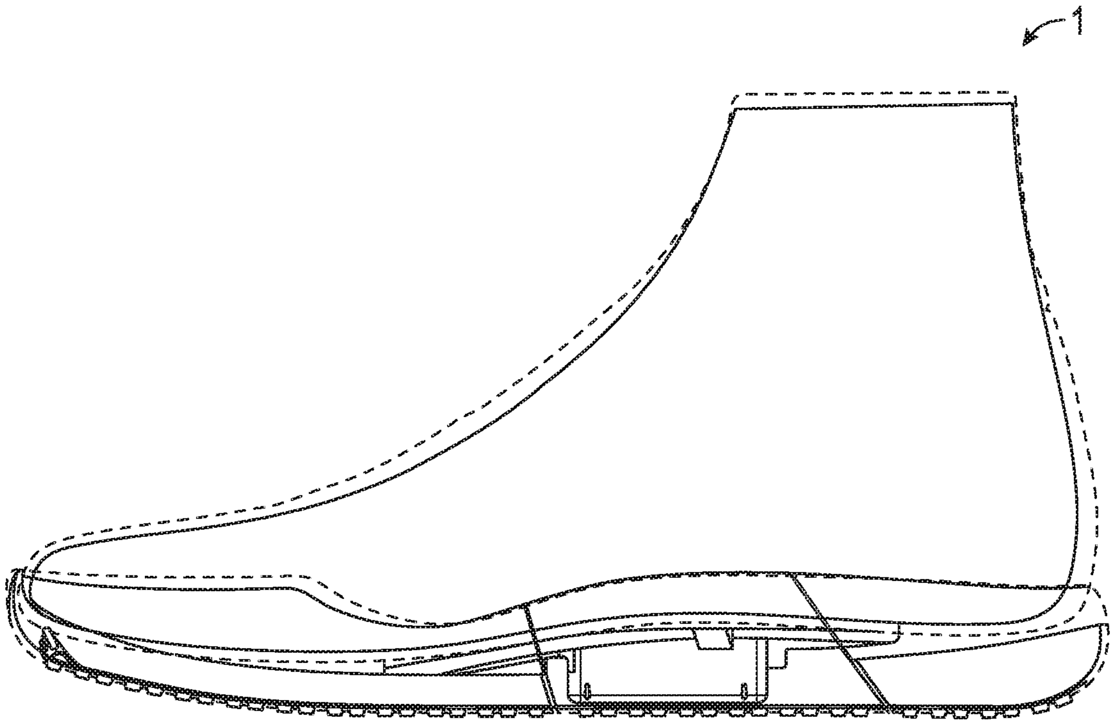
Figure 6C:
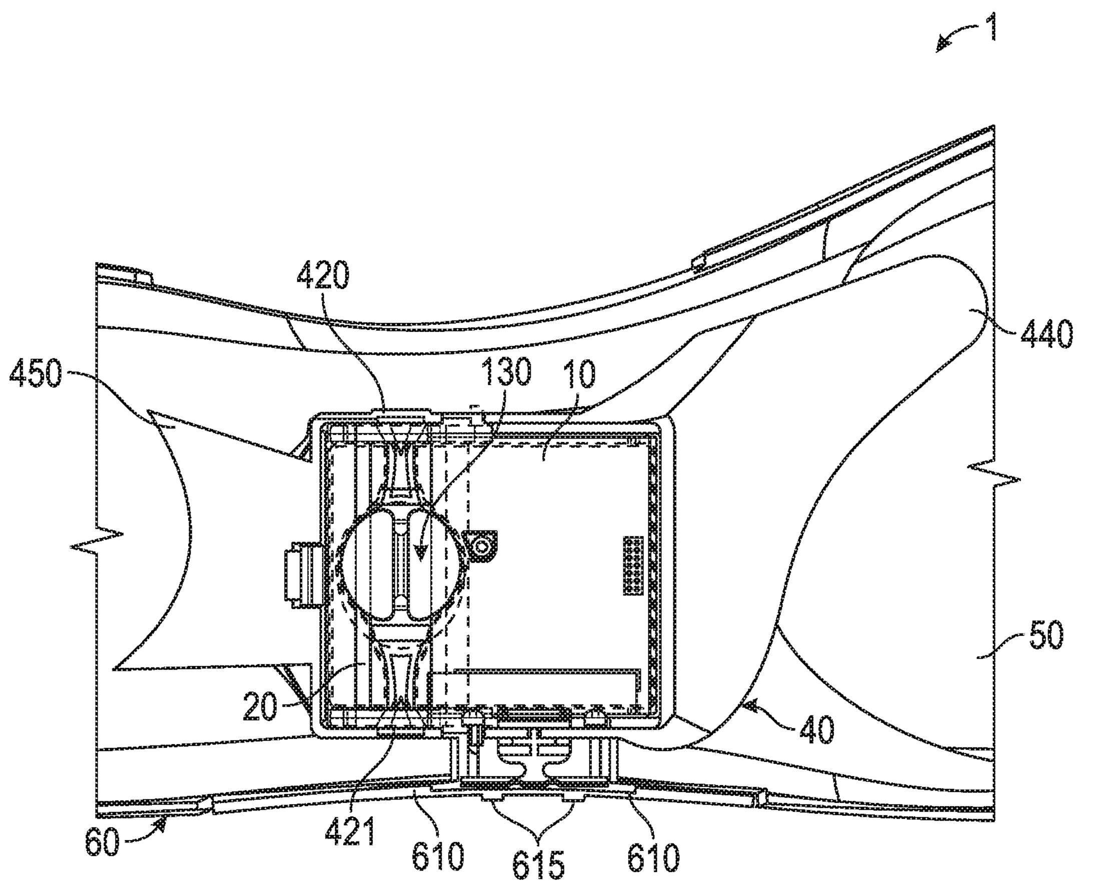

FIGS. 6A-6C are illustrations of a footwear assembly 1 including a motorized lacing engine 10, according to some example embodiments. In this example, FIGS. 6A-6C depict transparent examples of an assembled automated footwear platform 1 including a lacing engine 10, a mid-sole plate 40, a mid-sole 50, and an out-sole 60. FIG. 6A is a lateral side view of the automated footwear platform 1. FIG. 6B is a medial side view of the automated footwear platform 1. FIG. 6C is a top view, with the upper portion removed, of the automated footwear platform 1. The top view demonstrates relative positioning of the lacing engine 10, the lid 20, the actuator 30, the mid-sole plate 40, the mid-sole 50, and the out-sole 60. In this example, the top view also illustrates the spool 130, the medial lace guide 420 the lateral lace guide 421, the anterior flange 440, the posterior flange 450, the actuator cover 610, and the raised actuator interface 615.

Figure 7A:
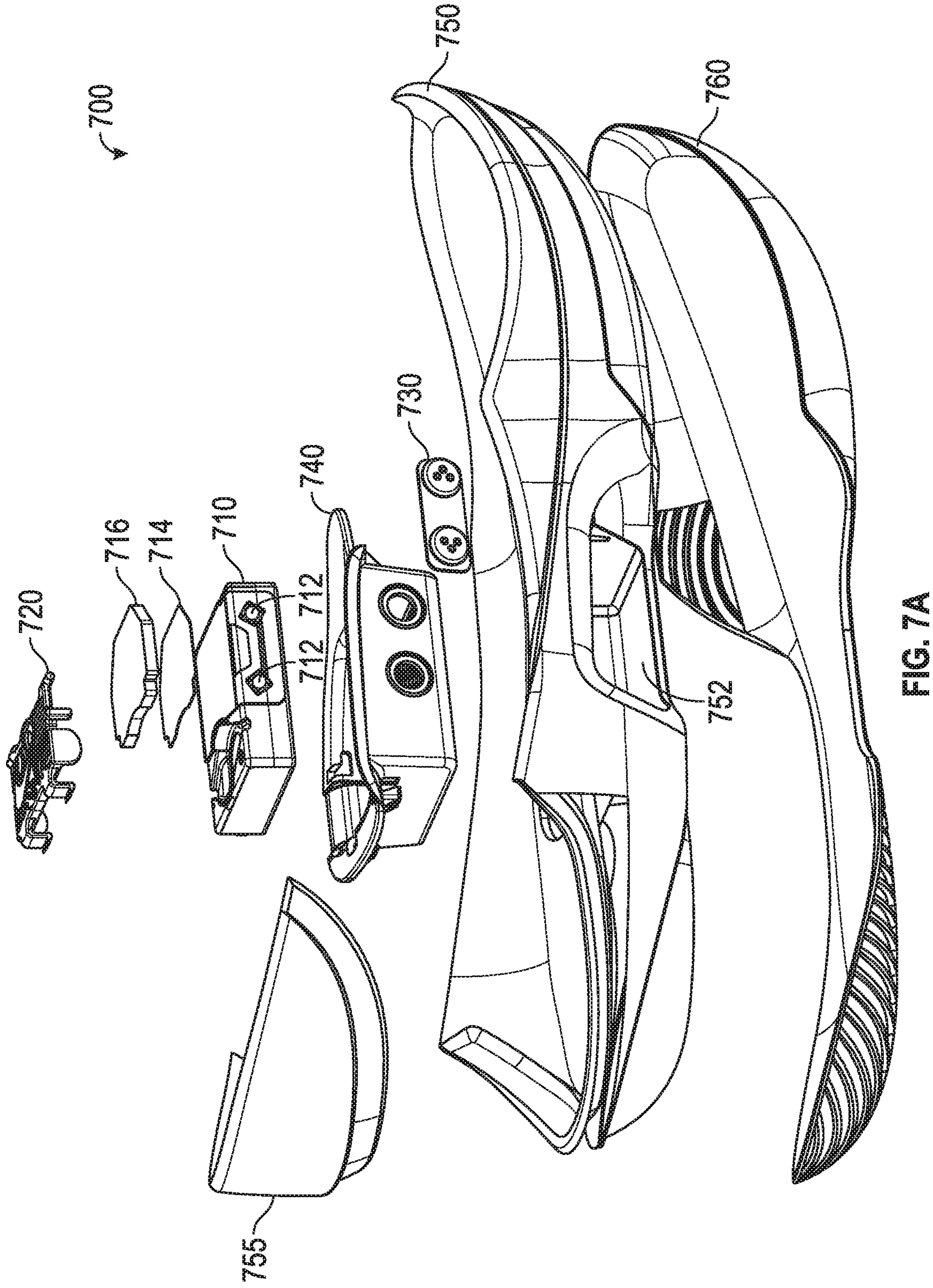
FIGS. 7A-7F are illustrations of a footwear assembly including a lacing engine, a mid-sole plate, and an actuator assembly, according to some example embodiments.

FIGS. 7A-7F are illustrations of a footwear assembly including a lacing engine, a mid-sole plate, and an actuator assembly, according to some example embodiments. FIG. 7A is an exploded view illustration of a footwear assembly 700. In this example, the footwear assembly is illustrated as including a lacing engine 710, a lid 720, an actuator assembly 730, a mid-sole plate 740, a mid-sole 750, a heel counter 755, and an out-sole 760. The lacing engine 710 can include a pair of control buttons 712, a shield 714, and a protective shim 716. As shown and discussed in detail in reference to the following figures, the footwear assembly 700, is assembled by adhering the out-sole 760 and the heel counter 755 to the mid-sole 750. Inserting the actuator assembly 730 into the mid-sole plate 740 and adhering the mid-sole plate 740 into a cavity in the mid-sole 750. Once assembled, the mid-sole plate 740 is partially exposed through the lacing engine cut-out 752, in this example. In other examples, the mid-sole 750 can be designed to only expose the actuator heads of the actuator assembly 730. After the mid-sole plate 740 and actuator assembly 730 are in the mid-sole 750, the lacing engine 710 can be dropped into place and the lid 720 snapped on to secure the lacing engine 710.

Figure 7B:
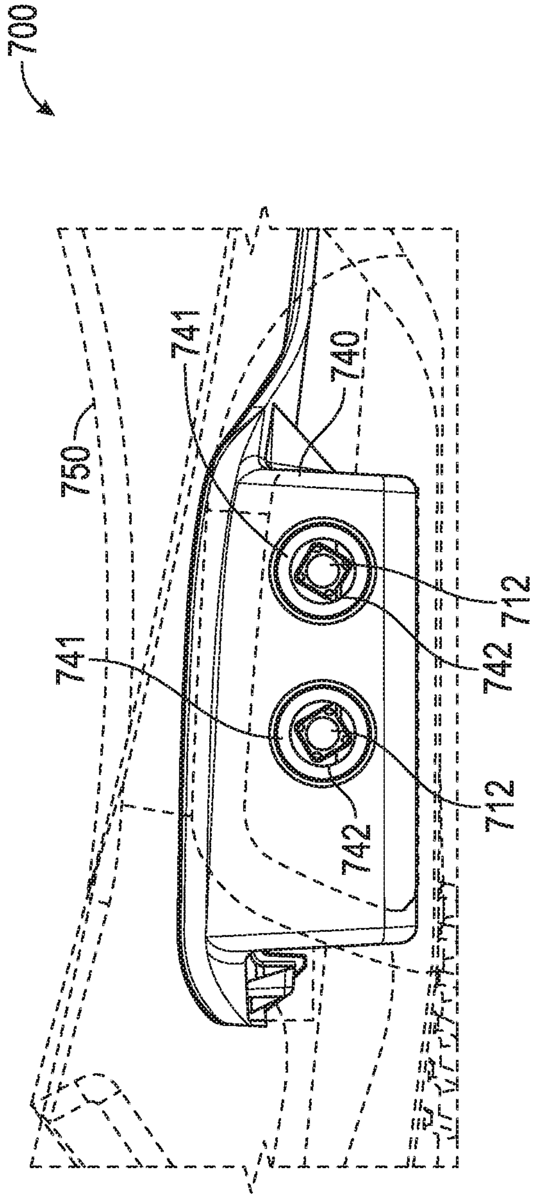

FIG. 7B is an illustration of a portion of a lateral side of the footwear assembly 700, according to an example embodiment. In this example, the mid-sole plate 740 is depicted within the mid-sole 750. The mid-sole plate 740 is partially exposed through the lacing engine cut-out 752 in the mid-sole 750. The lacing engine cut-out 752 allows direct access to the actuator apertures and actuator recesses 741 designed to hold the actuator assembly 730. In FIG. 7B the footwear assembly is shown without the actuator assembly 730 to illustrate how the buttons 721 of the lacing engine 710 align with the actuator apertures 742 in the mid-sole plate 740.

Figure 7C:
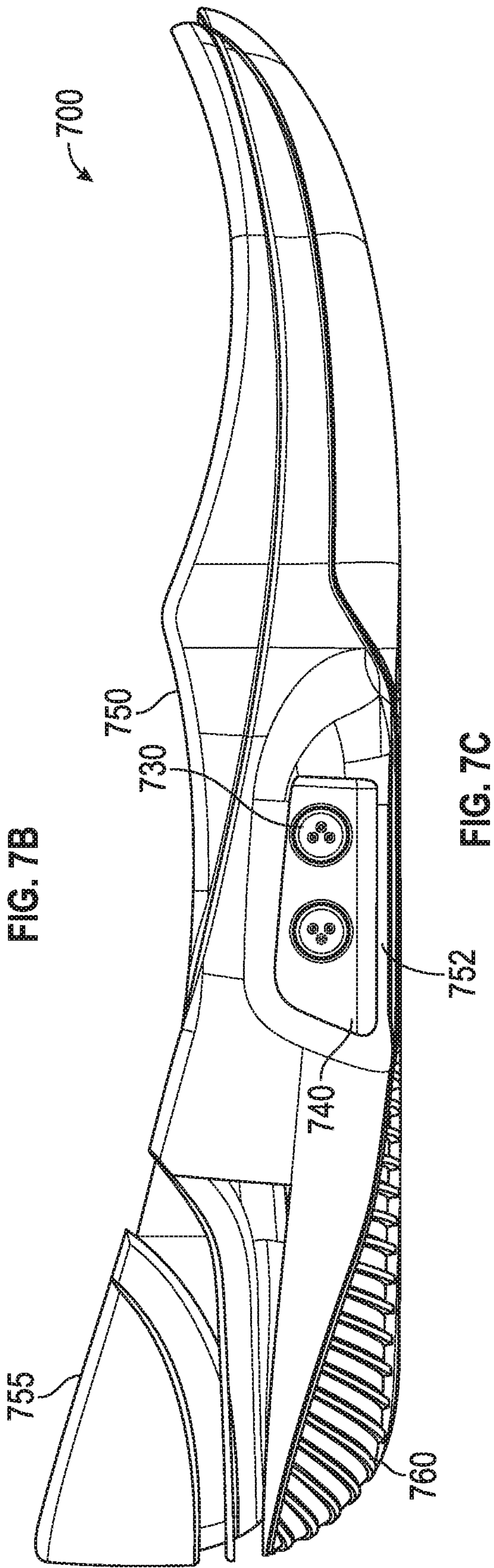

FIG. 7C is an illustration of the entire lateral side of a portion of footwear assembly 700. In this example, the footwear assembly includes the mid-sole 750 with out-sole 760 and heel counter 755 attached. The mid-sole plate 740 and actuator assembly 730 are also install and partially visible through lacing engine cut-out 752.

Figure 7D:
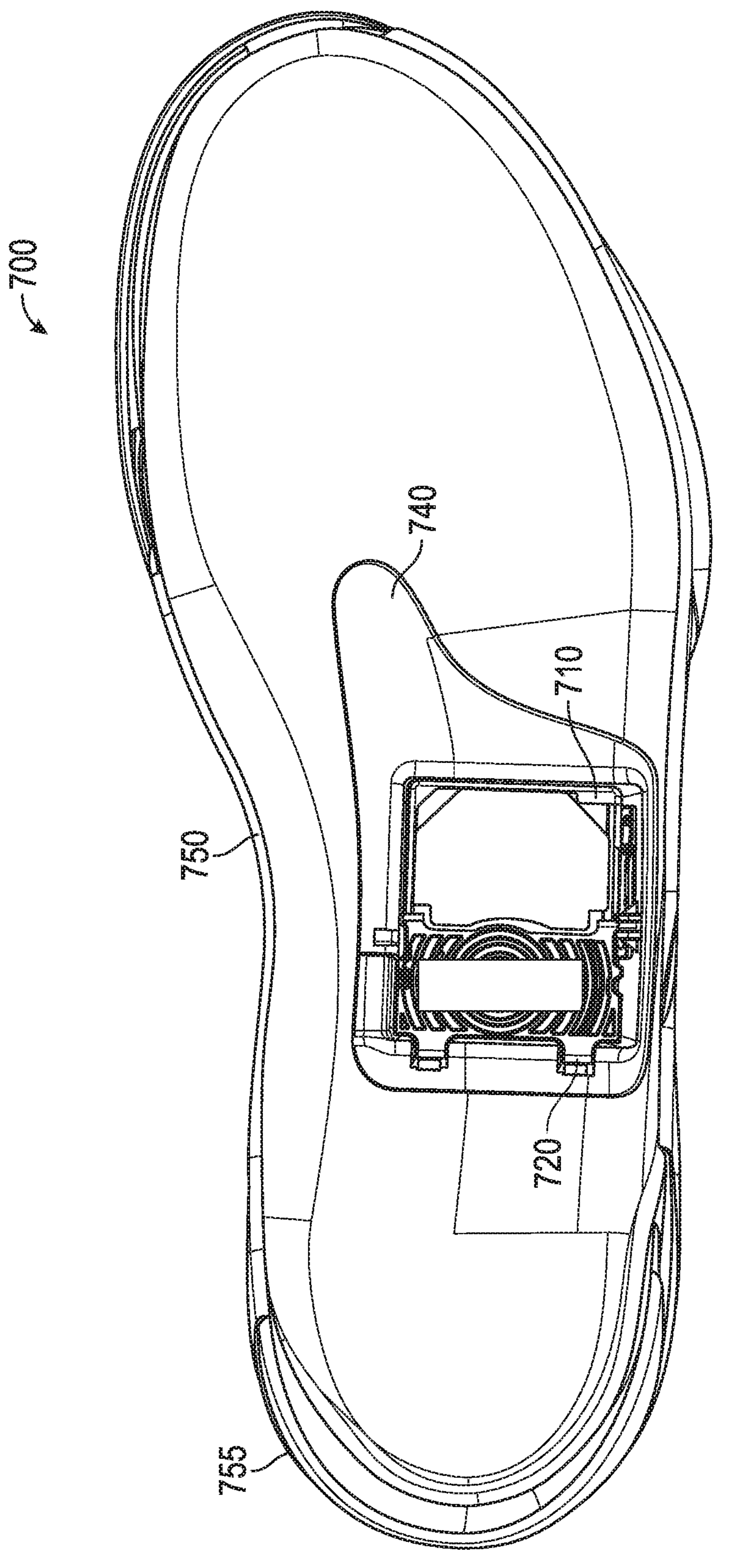

FIG. 7D is a top-view illustration of the lower portion of the footwear assembly 700, according to an example. In this example, the mid-sole 750 is illustrated holding the mid-sole plate 740 with lacing engine 710 secured into the mid-sole plate 750 with the lid 720. Heel counter 755 is also depicted in place attached to the proximal end of the mid-sole 750.

Figure 7E:
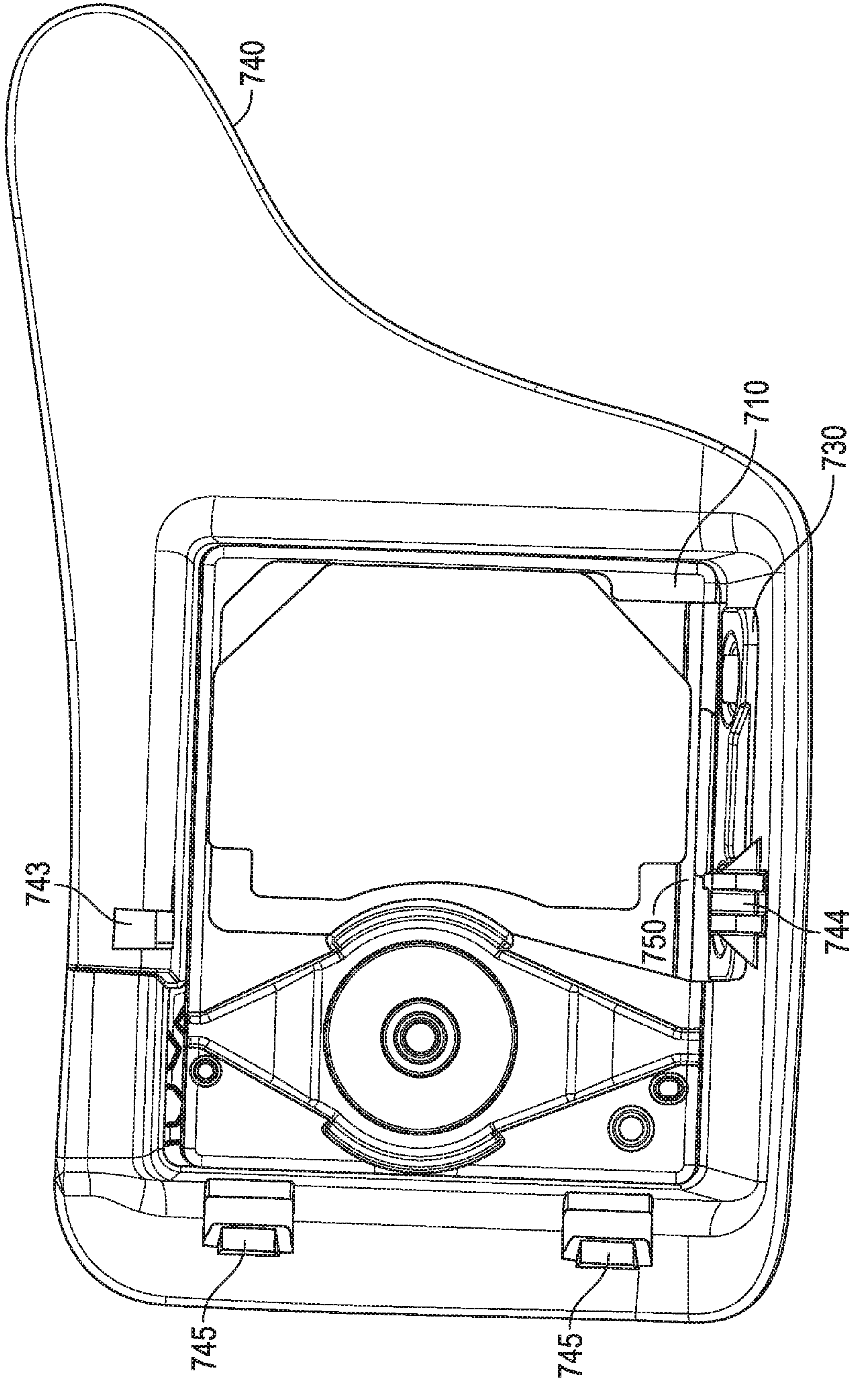

FIG. 7E is a top-view illustration of mid-sole plate 740 of the footwear assembly 700. In this example, the mid-sole plate 740 is illustrated with the lacing engine 710 and actuator assembly 730 installed. Details of the mid-sole plate 740 illustrated in FIG. 7E include medial lid hinge recess 743, lateral lid hinge recess 744, and two lid latch recesses 745. In some examples, the mid-sole plate 740 can include more or fewer lid latch recesses 745, for example the mid-sole plate 740 can include a single centered lid latch recess. As illustrated, the medial lid hinge recess 743 is a cut-out in the side and top surface along the medial side of the mid-sole plate 740. In contrast, the lateral lid hinge recess 744 includes a structure extending into the cavity for the lacing engine 710 and includes a channel to receive the lid hinge pin.

Figure 7F:
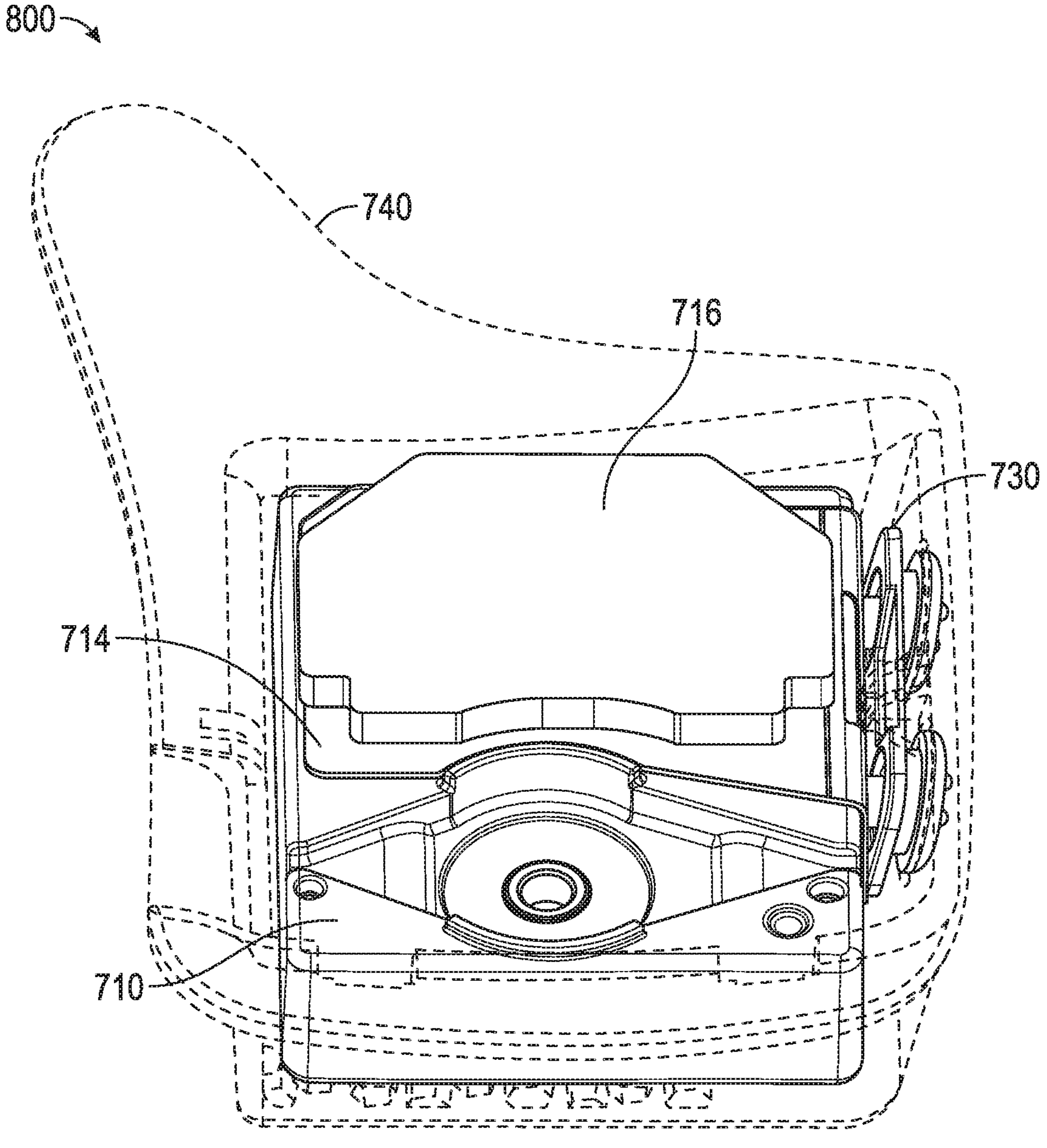

FIG. 7F is a top perspective view of the mid-sole plate 740 of the footwear assembly 700. In this example, the mid-sole plate 740 is once again depicted with the lacing engine 710 and actuator assembly 730 installed. The perspective view provides a better view of how the structures of the actuator assembly interface with the mid-sole plate 740 and the lacing engine 710. The detailed structures are discussed further in reference to FIGS. 9A-9F below.

Figure 8A:
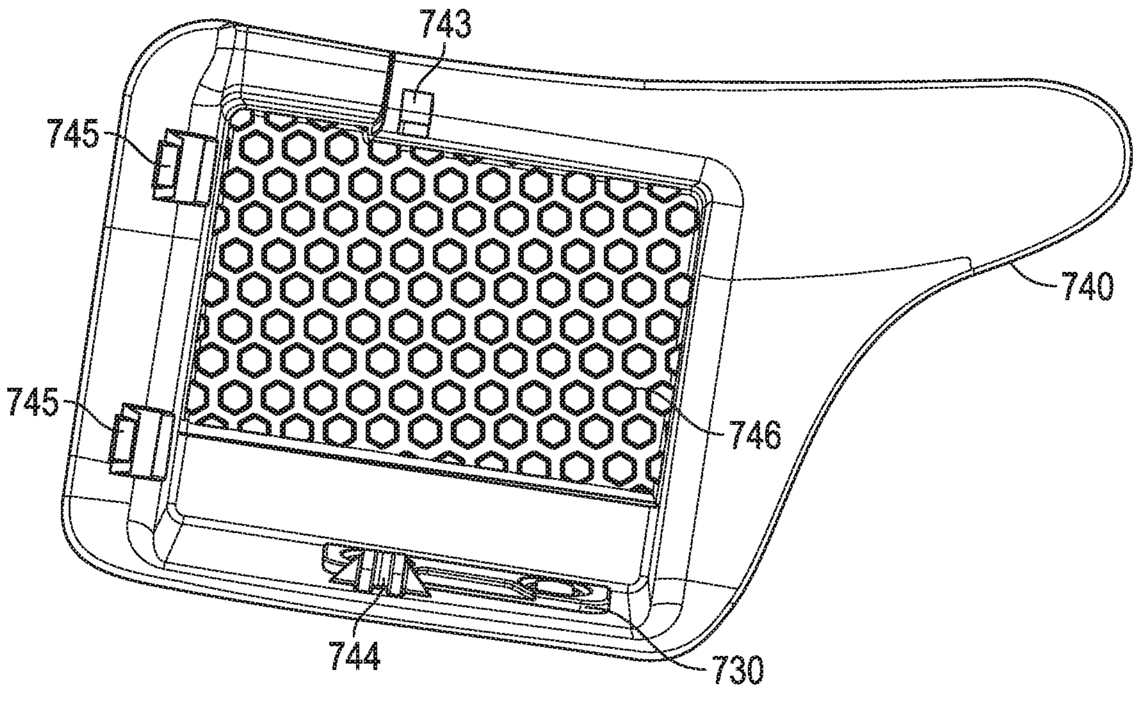
FIGS. 8A-8G are illustrations of a mid-sole plate and actuator assembly for use in a footwear assembly, according to some example embodiments.

FIGS. 8A-8G are illustrations of mid-sole plate 740 and actuator assembly 730 for use in a footwear assembly 700, according to some example embodiments. In this example, the mid-sole plate 740 is illustrated including an optional waffle reinforcement 746 along the floor of the lacing engine cavity. FIG. 8A is a top-view illustration of the mid-sole plate 740 that includes a view of the waffle reinforcement 746 distributed along a majority of the floor of the lacing engine cavity. In some examples, the waffle reinforcement can cover the entire floor or different portions of the floor of the lacing engine cavity. The waffle reinforcement 746 is designed to increase rigidity of the mid-sole plate 740 to improve impact protection as well as stresses induced by flex of the mid-sole plate 740. In this example, the waffle reinforcement is a series of interconnected hexagons, but other geometric shapes can be utilized. The side walls of the hexagons are slightly angled off vertical to improve mold release characteristics of the structure. The thicker base of the side walls also adds to the overall strength and rigidity of the structure.

Figure 8B:
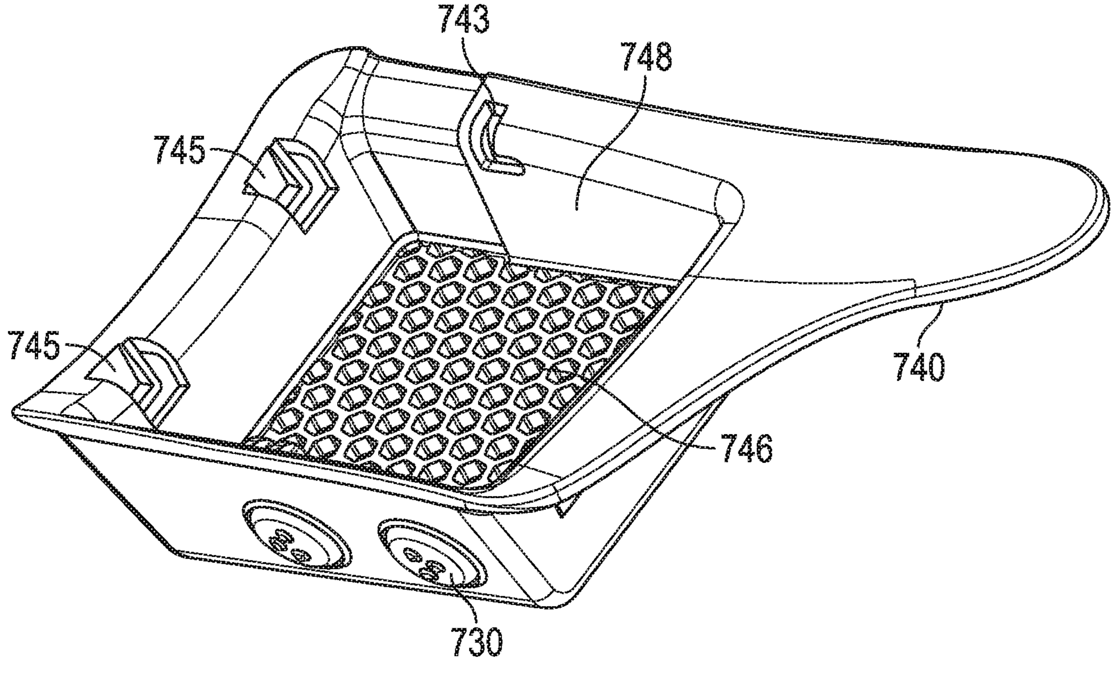

FIG. 8B is a perspective view illustration of the mid-sole plate 740 and the actuator assembly 730. In this example, the actuator heads of the actuator assembly 730 are visible on a lateral side of the mid-sole plate 740. The actuator heads of the actuator assembly 730 are squeezed through the actuator apertures 742 in the mid-sole plate 740 from inside the lacing engine cavity 748. As discussed below, the actuator assembly 730, in this example, is made of an elastomeric material to allow sufficient flexibility to be installed in the mid-sole plate 740. The elastomeric material also enhances the weather sealing capabilities of the actuator assembly 730. The lacing engine cavity 748 is also illustrated with the waffle reinforcement 746 along the floor of the cavity.

Figure 8C:
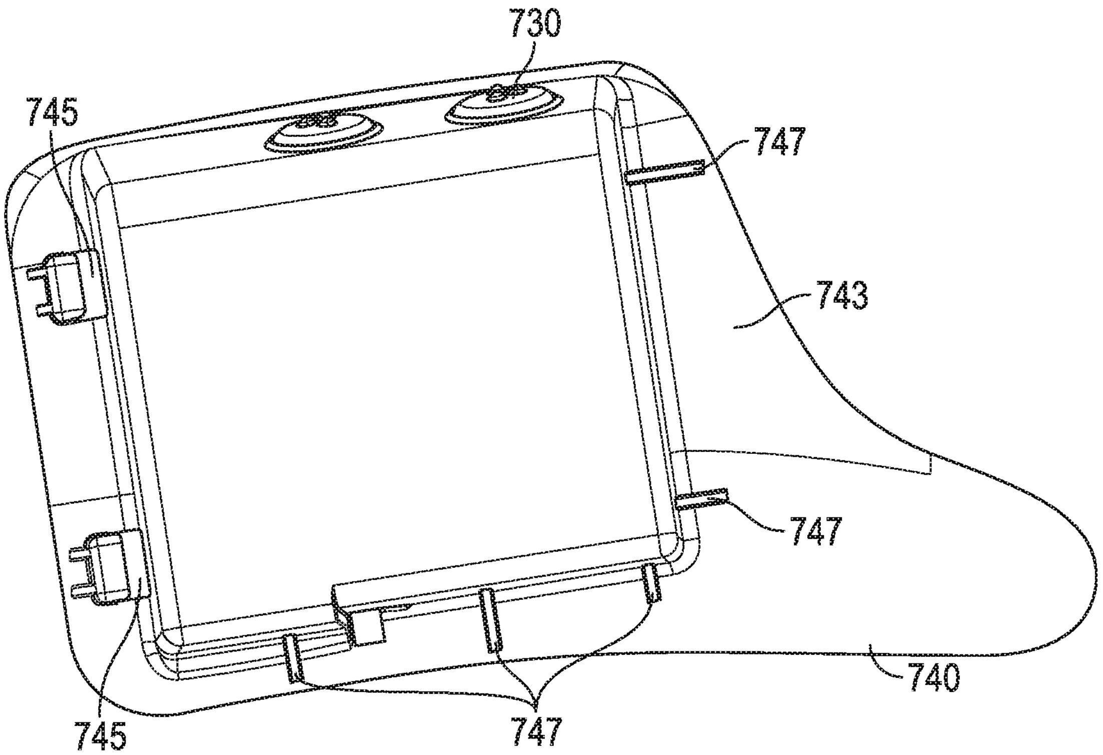

FIG. 8C is a bottom view illustration of the mid-sole plate 740. In this example, the mid-sole plate 740 is illustrated as including a series of supports 747 distributed around the outside side walls of the lacing engine cavity 748. The supports 747 provide an additional measure of structural rigidity to further assist in avoiding unwanted stresses from reaching the lacing engine disposed within the lacing engine cavity 748. Secondarily, the supports 747 also can assist in positioning and securing the mid-sole plate 740 within the mid-sole 750.

Figure 8D:
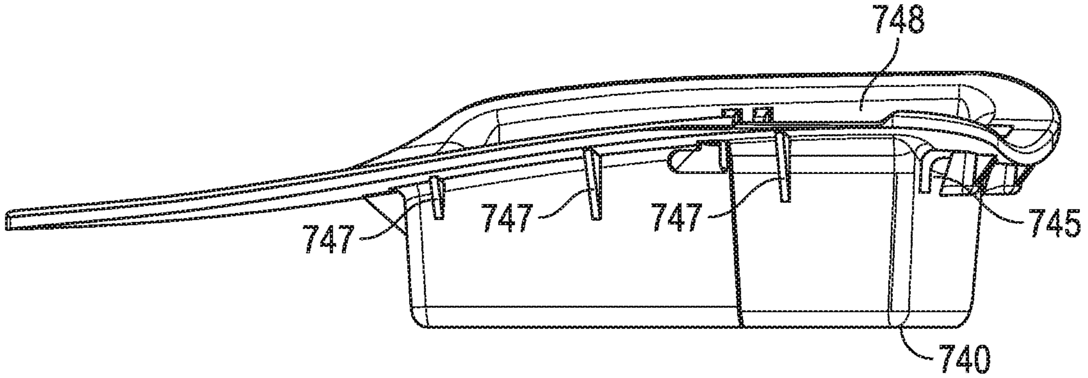
Figure 8E:
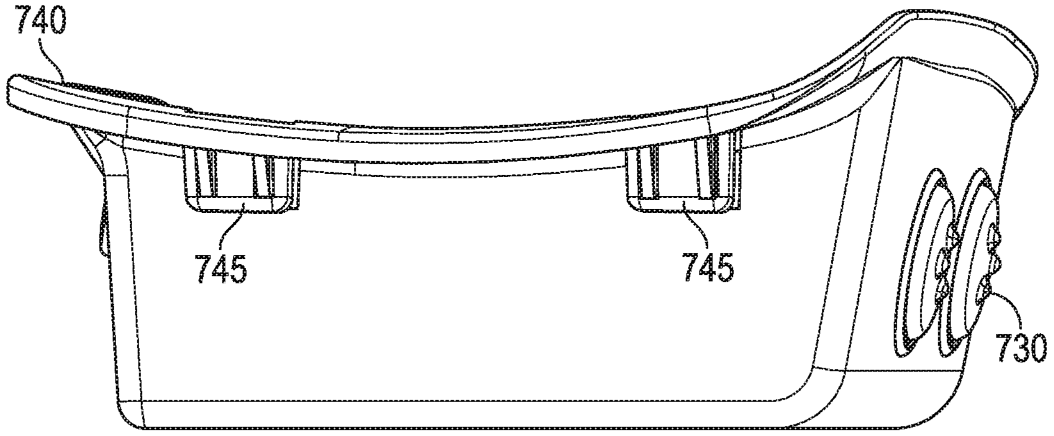
Figure 8F:
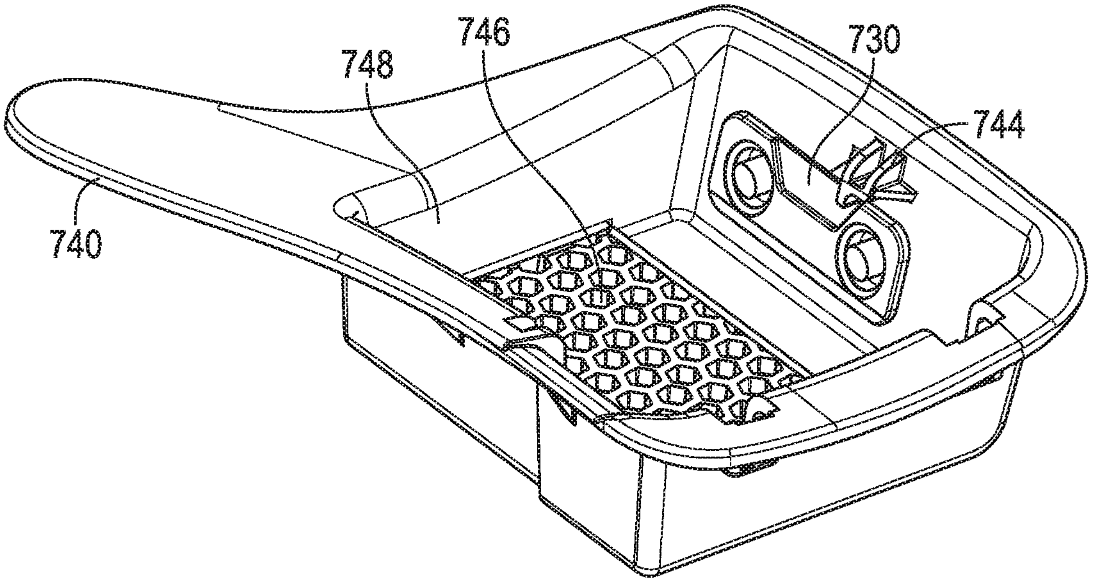

FIG. 8D is a medial side view of the mid-sole plate 740 and assists in visualizing some of the contours built into the mid-sole plate 740 to better conform to a user's foot shape. FIG. 8E is a rear or proximal view of the mid-sole plate 740, which also illustrates contours built into the mid-sole plate 740. FIG. 8F is a proximal perspective view of the mid-sole plate 740, which illustrates positioning of the actuator assembly 730 within the lacing engine cavity 748. Also illustrated is the lateral lid hinge recess 744 structure extending from the lateral side wall of the lacing engine cavity 748.

Figure 8G:
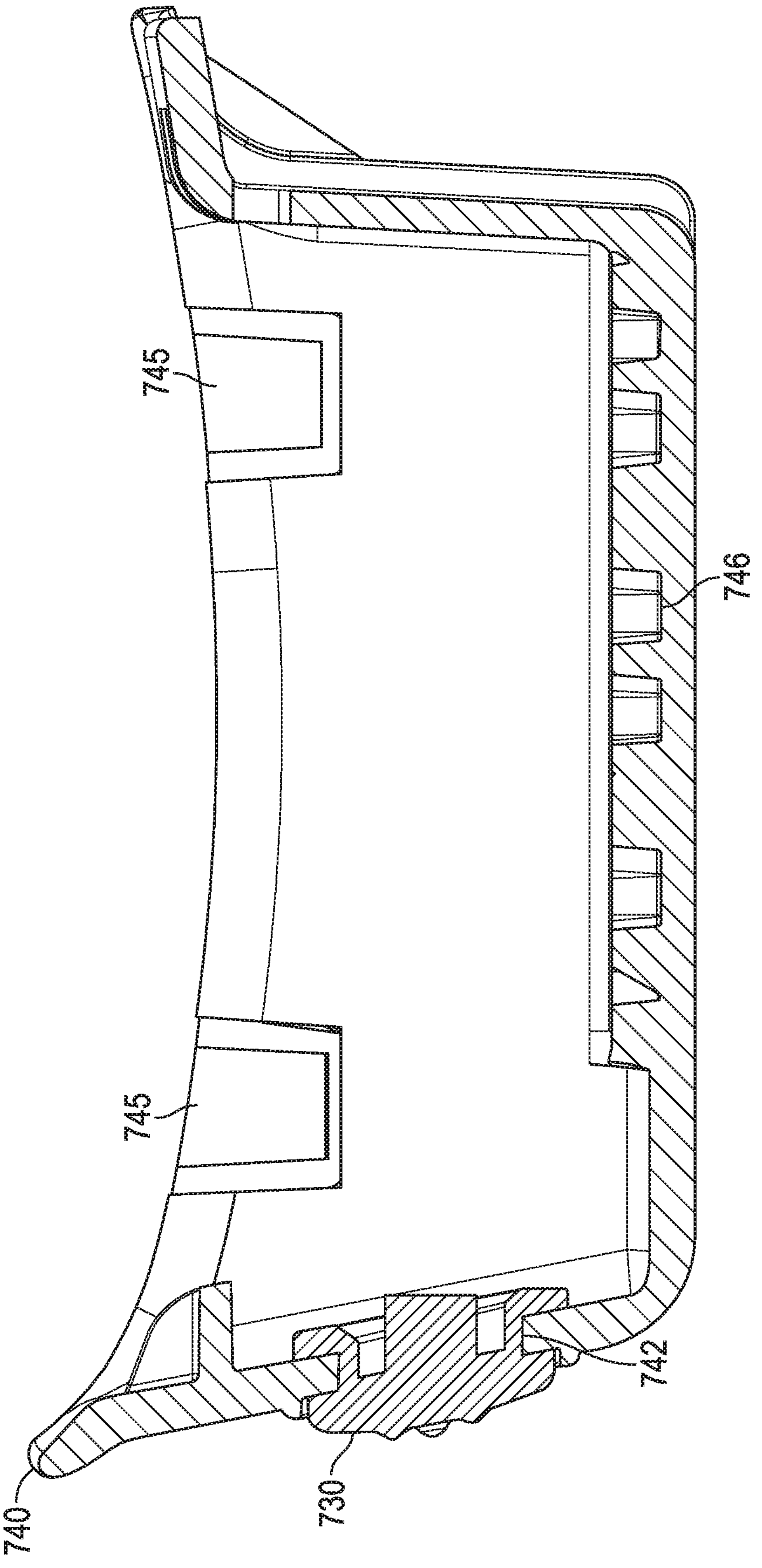

FIG. 8G is a cross-section view through one of the actuator heads of the mid-sole plate 740 and the actuator assembly 730. The cross-section view illustrates some of the structure of the actuator assembly 730 as well as how the actuator assembly 730 interfaces with the actuator apertures 742 in the mid-sole plate 740. As noted above, the sidewalls of the waffle reinforcement 746 are not completely vertical, but angle outward from the based of each hexagon. Exemplary details of the actuator assembly 730 structure are discussed below in reference to FIGS. 9A-9F.

FIGS. 9A-9F are illustrations of an actuator assembly used to control an automated lacing engine, according to some example embodiments. In some examples, the actuator assembly 730 is molded from a silicon-based elastomeric material to provide a flexible and translucent structure. The silicon-based material can also provide weather-sealing characteristics to assist in preventing water ingress into the mid-sole plate 740. The translucency allows for the actuator heads to transmit LED lighting from the lacing engine 710 external to the footwear assembly 700. Other flexible materials can also be utilized for the manufacture of the actuator assembly 730.

Figure 9A:
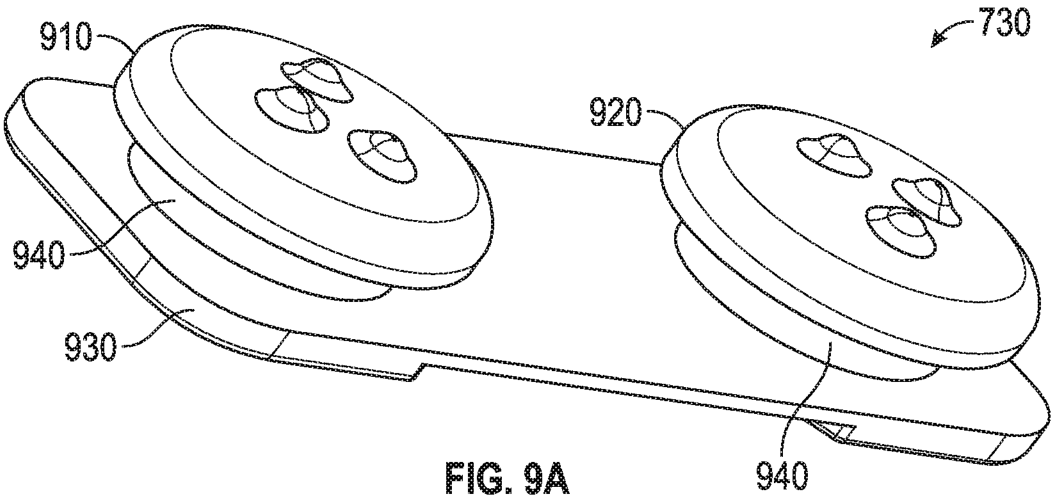
FIGS. 9A-9F are illustrations of an actuator assembly used to control an automated lacing engine, according to some example embodiments.
Figure 9B:
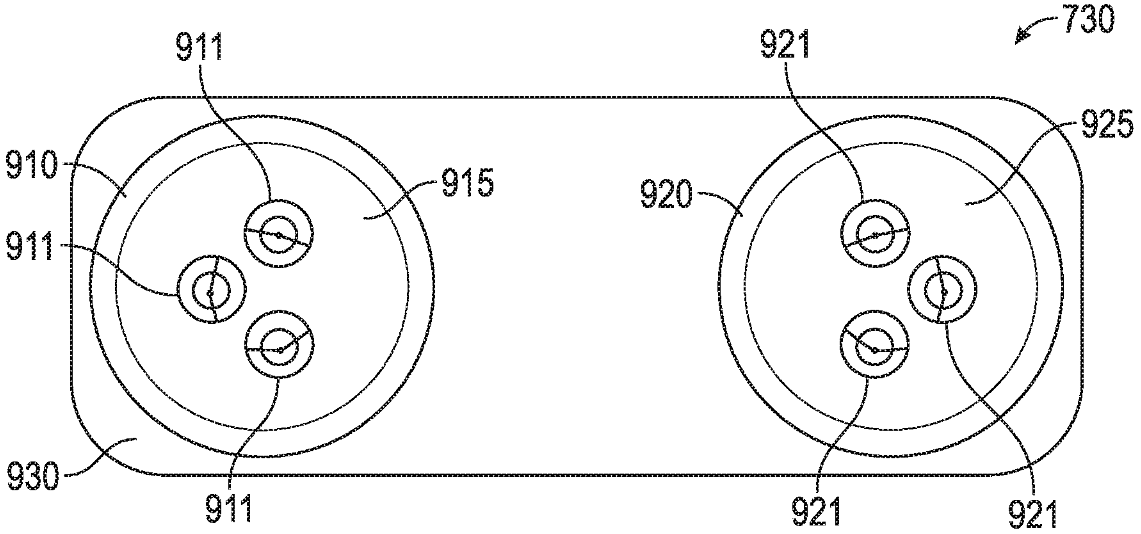
Figure 9C:
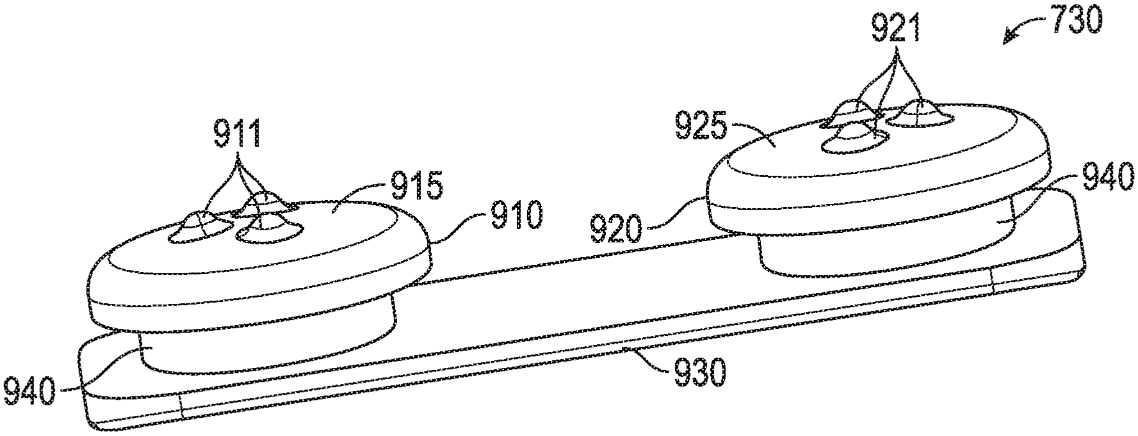

FIG. 9A is a perspective view of the actuator assembly 730 that illustrates a posterior actuator 910, an anterior actuator 920, and actuator plate interfaces 940. The posterior and anterior terminology is being used solely to provide some special orientation for the horizontally spaced actuators in this example actuator assembly. FIG. 9B is a top view illustration of actuator assembly 730. In this example, the actuator assembly 730 includes a posterior actuator 910 with a posterior actuator head 915 containing a set of posterior actuator dimples 911. The actuator assembly 730 also includes an anterior actuator 920 with an anterior actuator head 921 containing a set of anterior actuator dimples 921. The actuator dimples 911, 921 can be arranged in a unique pattern on each actuator head 915, 925 to enable tactile identification of the different actuators 910, 920. In this example, the actuator dimples 911, 921 are arranged in an arrowhead pattern, but other patterns can be produced. FIG. 9C is another perspective view of actuator assembly 730 illustrating a different view of the structures discussed above in reference to FIGS. 9A and 9B.

Figure 9D:
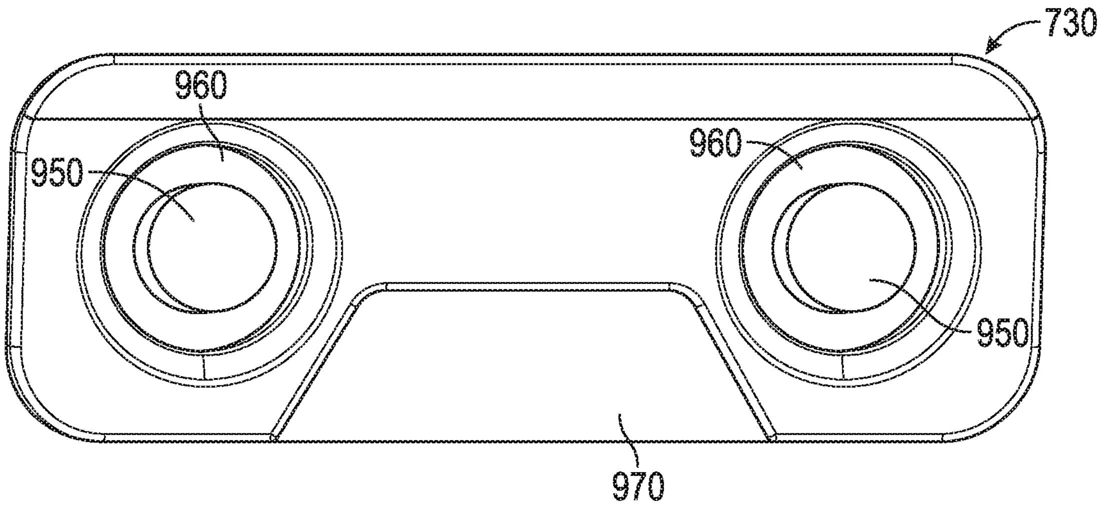

FIG. 9D is a bottom view of the actuator assembly 730, which includes illustration of structures such as button interfaces 950, actuation cavities 960 and plate recess 970. The button interfaces 950 in this example are cylindrical members extending from the backside of the actuator heads 915, 925. The button interfaces 950 are designed to engage the buttons on a lacing engine, such as buttons 712. The button interfaces 950 can also conduct light from LEDs within the lacing engine to illuminate the actuator heads 915, 925. Surrounding the button interfaces 950 is are actuation cavities 960, which in this example are donut shaped cylinders with chamfered edges leading to the back surface of the actuator frame 930. The actuation cavities 960 enable the actuator heads 915, 925 to have sufficient flexibility to allow for easy activation of buttons 712 on the lacing engine 710. The combination of the actuation cavities and actuator heads creates a sort of diaphragm that enable translation of the actuator interfaces 950. The volume of the actuation cavities 960 can be adjusted to adjust both the amount and ease of translation of the actuator interfaces 950 (e.g., depression of the actuation heads 915, 925). The button interfaces 950 and corresponding actuation cavities 960 can be easily adapted to accommodate different button placements and configurations on a lacing engine. Having a modular actuator assembly allows for different lacing engines to be matched with different actuator assemblies without need for major design changes to the mid-sole plate.

Figure 9E:
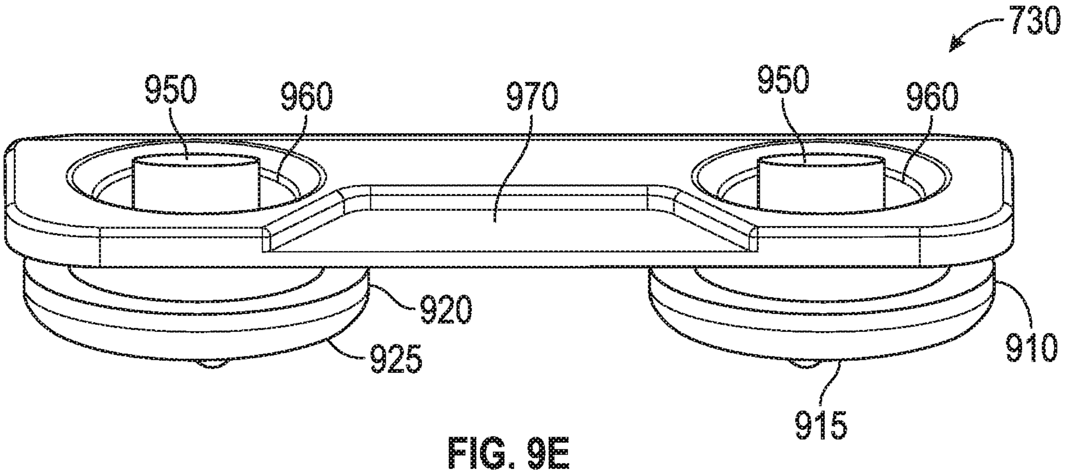

FIG. 9E is a perspective view of the back side of the actuator assembly 730. In this example, it is evident that the button interfaces 950 are not perpendicular with the interior surface of the actuator assembly 730. In other examples, the button interfaces 950 can be perpendicular to the interior surface or at some different angle, the orientation of the button interfaces 950 is dependent on the position and orientation of the buttons on the lacing engine. The plate recess 970 is configured to interface with a protrusion within the lacing engine cavity 748 of the mid-sole plate 740. The interface between the plate recess 970 and the mid-sole plate 740 assist in maintaining alignment.

Figure 9F:
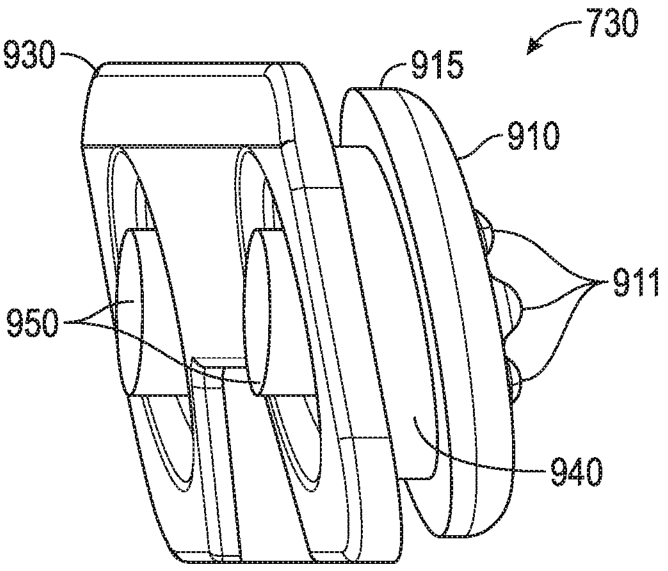

FIG. 9F is a side perspective view of the actuator assembly 730 according to an example embodiment. In this example, the actuator assembly is illustrated as including a posterior actuator 910 with a posterior actuator head having posterior actuator dimples 911. The posterior actuator 910 is connected to the actuator frame by the actuator plate interface 940, which is a reduced diameter cylindrical connection in this example. As illustrated in other figures, the actuator plate interface 940 is a hollow cylinder with a sidewall thickness that allows for sufficient flexibility to be inserted into an actuator aperture 742. In this example, the lip of the actuator head 910 extending out from the actuator plate interface 940 includes a flat inner surface that mates with an exterior surface of the mid-sole plate 740 when assembled.

Figure 10:
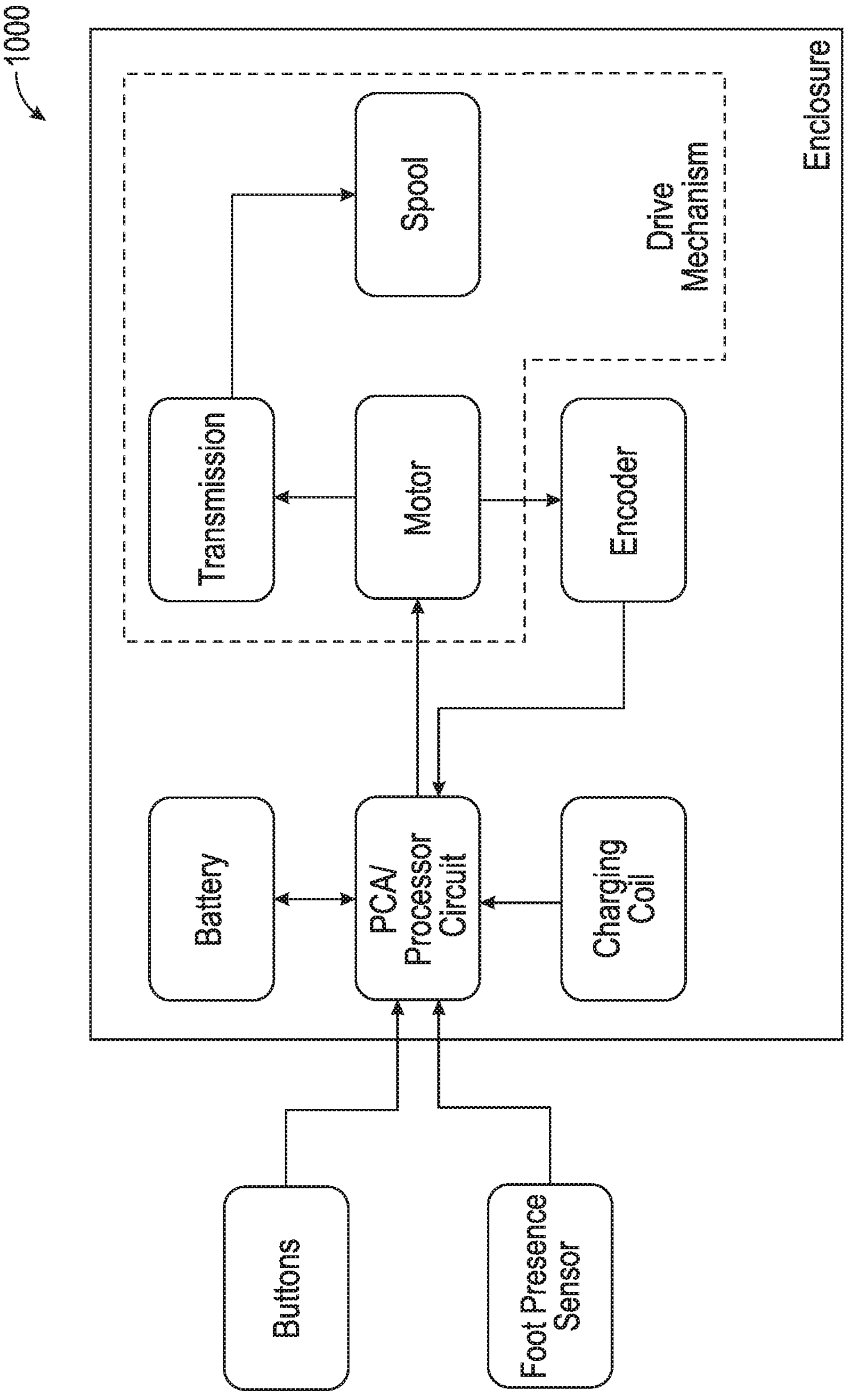
FIG. 10 is a block diagram illustrating components of a motorized lacing system, according to some example embodiments.

FIG. 10 is a block diagram illustrating components of a motorized lacing system for footwear, according to some example embodiments. The system 1000 illustrates basic components of a motorized lacing system such as including interface buttons, foot presence sensor(s), a printed circuit board assembly (PCA) with a processor circuit, a battery, a charging coil, an encoder, a motor, a transmission, and a spool. In this example, the interface buttons and foot presence sensor(s) communicate with the circuit board (PCA), which also communicates with the battery and charging coil. The encoder and motor are also connected to the circuit board and each other. The transmission couples the motor to the spool to form the drive mechanism.

In an example, the processor circuit controls one or more aspects of the drive mechanism. For example, the processor circuit can be configured to receive information from the buttons and/or from the foot presence sensor and/or from the battery and/or from the drive mechanism and/or from the encoder, and can be further configured to issue commands to the drive mechanism, such as to tighten or loosen the footwear, or to obtain or record sensor information, among other functions.

EXAMPLES

The present inventors have recognized, among other things, a need for an improved modular lacing engine for automated and semi-automated tightening of shoe laces. This document describes, among other things, the mechanical design of an actuator assembly for controlling an automated modular lacing engine within a footwear platform. The following examples provide a non-limiting examples of the actuator and footwear assembly discussed herein.

Example 1 describes subject matter including an actuator to control a lacing engine within an automated footwear platform. The actuator can comprise an actuator frame and a plurality of actuators. In this example, the actuator frame adapted to interconnect elements of the actuator assembly, the actuator frame including a width, a length, and a thickness where the width and length form an exterior surface and an interior surface separated by the thickness. The plurality of actuators integrated into the actuator frame, each actuator of the plurality of actuators including an actuator head extending from the exterior surface and a button interface extending from the backside of the actuator head through the interior surface.

In Example 2, the subject matter of Example 1 can optionally include the actuator frame and the plurality of actuators forming a single molded structure.

In Example 3, the subject matter of Example 2 can optionally include the single molded structure is formed from a translucent and water proof material.

In Example 4, the subject matter of Example 2 can optionally include the single molded structure being formed from a silicon-based material.

In Example 5, the subject matter of any one of Examples 1 to 4 can optionally include the button interfaces of the plurality of actuators can each engage with a respective button of a plurality of buttons on a lacing engine when the actuator assembly and the lacing engine are installed in a footwear assembly.

In Example 6, the subject matter of Example 5 can optionally include the button interfaces being adapted to conduct light emitted from LEDs adjacent or integrated into the plurality of buttons on the lacing engine.

In Example 7, the subject matter of any one of Examples 1 to 6 can optionally include each button interface of the plurality of actuators extending from a central portion of the backside of the respective actuator head.

In Example 8, the subject matter of Example 7 can optionally include each actuator of the plurality of actuators including an actuation cavity surrounding the button interface and forming an aperture in the interior surface of the actuator frame.

In Example 9, the subject matter of Example 8 can optionally include the actuation cavity provides clearance for actuation of each actuator of the plurality of actuators.

In Example 10, the subject matter of Example 7 can optionally include each button interface of the plurality of actuators having a cylindrical shaft extending from the central portion of the backside of the respective actuator head to engage a respective button on a lacing engine.

In Example 11, the subject matter of any one of Examples 1 to 10 can optionally include each actuator of the plurality of actuators having an actuator plate interface, the actuator plate interface including a reduced diameter area between the actuator head and the exterior surface.

In Example 12, the subject matter of Example 11 can optionally include the actuator plate interface being adapted to extend through an aperture in a mid-sole plate when the actuator assembly is installed in a footwear assembly.

In Example 13, the subject matter of Example 12 can optionally include when the actuator assembly is installed in the footwear assembly, the actuator head, actuator plate interface and exterior surface of the actuator frame can operate to seal the aperture in the mid-sole plate.

In Example 14 the subject matter of any one of Examples 1 to 13 can optionally include each actuator head of the plurality of actuators having a unique dimple pattern allowing for tactile identification of each individual actuator of the plurality of actuators.

Example 15 describes subject matter including a footwear assembly including an actuator assembly for controlling a lacing engine within an automated footwear platform. In this example, the footwear assembly can include an upper portion, a mid-sole portion and an out-sole portion. The upper portion can be configured to secure a foot within the footwear assembly. The mid-sole portion can be coupled to the upper portion and adapted to receive a mid-sole plate to house a lacing engine, the mid-sole plate including a plurality of apertures to receive a plurality of actuators in an actuator assembly, the plurality of actuators provide access to control functions of the lacing engine. The out-sole can be coupled to at least an inferior portion of the mid-sole portion.

In Example 16, the subject matter of Example 15 can optionally include the plurality of apertures in the mid-sole plate being circular and dimensioned to receive an actuator plate interface of the actuator assembly.

In Example 17, the subject matter of Example 16 can optionally include the actuator plate interface can be a reduced cross-section cylindrical neck portion between an actuator head and actuator frame of the actuator assembly.

In Example 18, the subject matter of Example 17 can optionally include a combination of the actuator head, the actuator plate interface, and the actuator frame that function to seal the plurality of apertures in the mid-sole plate from water ingress.

In Example 19, the subject matter of Example 17 can optionally include the actuator assembly being formed from a silicon-based material to facilitate a press-fit assembly of each actuator plate interface into the plurality of apertures.

In Example 20, the subject matter of any one of Examples 15 to 19 can optionally include the mid-sole plate having a reinforced inferior floor to protect the lacing engine.

In Example 21, the subject matter of Example 20 can optionally include the reinforced inferior floor having a waffle structure with angled side walls to facilitate mold release.

In Example 22, the subject matter of any one of Examples 15 to 21 can optionally include the mid-sole plate having a lid interface to receive a lid to secure the lacing engine and assist in routing a lace cable into the lacing engine.

In Example 23, the subject matter of Example 22 can optionally include the lid interface having one or more latch recesses, a medial lid hinge recess and a lateral lid hinge recess.

ADDITIONAL NOTES

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The disclosure, therefore, is not to be taken in a limiting sense, and the scope of various embodiments includes the full range of equivalents to which the disclosed subject matter is entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein, such as the motor control examples, can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMS), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. An Abstract, if provided, is included to comply with United States rule 37 C.F.R. § 1.72(b), to allow the reader to quickly ascertain the nature of the technical disclosure. It is submitted with the understanding that it will not be used to interpret or limit the scope or meaning of the claims. Also, in the above Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A mid-sole plate for use in a footwear assembly, the mid-sole plate comprising:

a body including a medial side, a lateral side, a superior surface and an inferior surface;

a lacing engine cavity disposed within the body and opening out to the superior surface of the body to receive a lacing engine, the lacing engine cavity including a floor to support the lacing engine once received into the lacing engine cavity, wherein the floor includes a reinforced floor structure covering a portion of the floor extending from a lateral side to a position adjacent a first lid latch recess to increase rigidity of the floor of the lacing engine cavity;

a medial lace guide disposed along the medial side of the body to direct a lace into the lacing engine cavity; and a lateral lace guide disposed along the lateral side of the body to direct the lace into the lacing engine cavity.

2. The mid-sole plate of claim 1, wherein the body includes a lid interface to receive a lid to cover a portion of the lacing engine when disposed within the lacing engine cavity.

3. The mid-sole plate of claim 1, wherein the medial lace guide and the lateral lace guide include opposing inferiorly slated ramps to guide the lace into the lacing engine.

4. The mid-sole plate of claim 1, wherein the medial lace guide and the lateral lace guide each include chamfered edges to reduce wear on the lace.

5. The mid-sole plate of claim 1, wherein the body includes a series of support structures distributed around outside walls of the lacing engine cavity.

6. The mid-sole plate of claim 1, wherein the reinforced floor structure includes a waffle reinforcement to provide impact protection and protect against flex induced stresses on the lacing engine.

7. The mid-sole plate of claim 6, wherein the waffle reinforcement covers all of the portion of the floor extending from the lateral side to the position adjacent the first lid latch recess.

8. The mid-sole plate of claim 1, wherein the body includes an anterior flange extending out from the lacing engine cavity along the medial side or the lateral side of the body.

9. The mid-sole plate of claim 8, wherein the anterior flange is contoured and extends along the medial side of the body to provide support under an arch of a footwear platform including the mid-sole plate.

10. The mid-sole plate of claim 1, wherein the body includes an actuator interface adapted to receive an actuator to provide a user interface to buttons on the lacing engine.

11. The mid-sole plate of claim 10, wherein the actuator interface includes a plurality of actuator apertures through a sidewall of the lacing engine cavity.

12. A mid-sole plate configured to hold a lacing engine within a lower portion of a footwear assembly, the mid-sole plate comprising:

a lacing engine cavity to receive the lacing engine, the lacing engine cavity including sidewalls and a floor, wherein the floor includes a reinforced floor structure encompassing a portion of the floor extending from a lateral side to a position adjacent a first lid latch recess to increase rigidity of the floor of the lacing engine cavity; and a lid configured to secure the lacing engine within the lacing engine cavity.

13. The mid-sole plate of claim 12, wherein the reinforced floor structure includes a waffle reinforcement to provide impact protection and protect against flex induced stresses on the lacing engine.

14. The mid-sole plate of claim 13, wherein the waffle reinforcement covers an entire superior surface of the floor of the lacing engine cavity.

15. The mid-sole plate of claim 12, wherein the mid-sole plate includes an anterior flange extending out from the lacing engine cavity along a medial side or a lateral side of the lacing engine cavity.

16. The mid-sole plate of claim 15, wherein the anterior flange is contoured and extends along the medial side of the lower portion to provide support under an arch of the footwear assembly including the mid-sole plate.

17. The mid-sole plate of claim 12, wherein the lacing engine cavity includes a plurality of actuator recesses, each actuator recess of the plurality of actuator recesses adapted to receive an actuator to provide a user interface to buttons on the lacing engine.

18. The mid-sole plate of claim 17, wherein each actuator recess of the plurality of actuator recesses includes an actuator aperture through a lateral sidewall of the sidewalls of the lacing engine cavity.

* * * * *